United States Patent
Sun et al.

(10) Patent No.: US 12,288,315 B2
(45) Date of Patent: Apr. 29, 2025

(54) IMAGE PROCESSING METHOD AND ELECTRONIC APPARATUS

(71) Applicant: SAMSUNG ELECTRONICS CO., LTD., Suwon-si (KR)

(72) Inventors: Bin Sun, Beijing (CN); Yanlong Sun, Beijing (CN); Yong A, Beijing (CN); Wei Li, Beijing (CN); Lanlan Zhang, Beijing (CN); Zhezhu Jin, Beijing (CN); Yingying Jiang, Beijing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 353 days.

(21) Appl. No.: 17/886,172

(22) Filed: Aug. 11, 2022

(65) Prior Publication Data
US 2022/0392038 A1    Dec. 8, 2022

Related U.S. Application Data

(63) Continuation of application No. PCT/KR2021/001557, filed on Feb. 5, 2021.

(30) Foreign Application Priority Data

Feb. 11, 2020 (CN) .......................... 202010087287.1
Jun. 28, 2020 (CN) .......................... 202010600882.0

(51) Int. Cl.
G06K 9/00      (2022.01)
G06T 3/4046    (2024.01)
(Continued)

(52) U.S. Cl.
CPC .............. *G06T 5/90* (2024.01); *G06T 3/4046* (2013.01); *G06T 5/20* (2013.01); *G06T 5/50* (2013.01);
(Continued)

(58) Field of Classification Search
CPC ..... G06T 5/00–94; G06T 2207/20172–20208; G06T 2207/30196;
(Continued)

(56) References Cited

U.S. PATENT DOCUMENTS 7,817,850 B2    10/2010    Atsumi et al.
8,509,569 B2    8/2013    Weiss et al.
(Continued)

FOREIGN PATENT DOCUMENTS

| CN | 102360506 A | 2/2012 |
|---|---|---|
| CN | 104700353 A | 6/2015 |

(Continued)

OTHER PUBLICATIONS

Communication dated Jun. 29, 2023, issued by the European Patent Office in counterpart European Application No. 21753231.6.
(Continued)

*Primary Examiner* — Atiba O Fitzpatrick
(74) *Attorney, Agent, or Firm* — Sughrue Mion, PLLC

(57) ABSTRACT

The present disclosure provides methods, apparatuses, and computer-readable mediums for image processing. In some embodiments, a method of image processing includes acquiring, from a user, a first image. The method further includes removing, using an image de-filter network, a filter effect applied to the first image to generate a second image. The method further includes obtaining, based on the first image and the second image, an image filter corresponding to the filter effect. The method further includes rendering a third image using the obtained image filter to output a fourth image.

20 Claims, 16 Drawing Sheets

(51) Int. Cl.
<table>
<tr><td>G06T 5/20</td><td>(2006.01)</td></tr>
<tr><td>G06T 5/50</td><td>(2006.01)</td></tr>
<tr><td>G06T 5/90</td><td>(2024.01)</td></tr>
<tr><td>G06T 7/11</td><td>(2017.01)</td></tr>
<tr><td>G06V 10/44</td><td>(2022.01)</td></tr>
<tr><td>G06V 10/74</td><td>(2022.01)</td></tr>
<tr><td>G06V 10/764</td><td>(2022.01)</td></tr>
<tr><td>G06V 10/77</td><td>(2022.01)</td></tr>
<tr><td>G06V 10/82</td><td>(2022.01)</td></tr>
<tr><td>G06V 10/94</td><td>(2022.01)</td></tr>
<tr><td>G06V 40/16</td><td>(2022.01)</td></tr>
</table>

(52) U.S. Cl.
CPC .............. *G06T 7/11* (2017.01); *G06V 10/443* (2022.01); *G06V 10/761* (2022.01); *G06V 10/764* (2022.01); *G06V 10/7715* (2022.01); *G06V 10/82* (2022.01); *G06V 10/95* (2022.01); *G06V 40/161* (2022.01); *G06T 2207/10024* (2013.01); *G06T 2207/20021* (2013.01); *G06T 2207/20084* (2013.01); *G06T 2207/20221* (2013.01); *G06T 2207/30201* (2013.01)

(58) Field of Classification Search
CPC ... G06T 2207/30201; G06T 7/80; G06T 7/90; G06T 7/97; G06T 2207/20081; G06T 2207/20084; G06T 9/002; G06T 5/60; H04N 1/409–4097; H04N 1/60–628; H04N 23/70–76; H04N 5/20–213; H04N 19/117; H04N 9/3179–3188; H04N 9/646; H04N 1/6052; H04N 1/6055; G09G 2320/02–0266; G06V 40/00–179; G06V 10/7715; G06V 10/70; G06V 10/82; G06V 10/774–7796; G06V 10/454; G06K 9/6256; G06K 9/6257; G06K 9/6259; G06N 3/02–126; G06N 20/00–20; G06F 18/214–2155; G06F 7/023; G06F 40/16; G01N 29/4481

See application file for complete search history.

(56) References Cited

U.S. PATENT DOCUMENTS

<table>
<tr><td>9,959,484 B2</td><td>5/2018</td><td>Wang et al.</td><td></td></tr>
<tr><td>11,722,796 B2 *</td><td>8/2023</td><td>Vyas</td><td>H04N 23/51</td></tr>
<tr><td>2007/0071347 A1 *</td><td>3/2007</td><td>Li</td><td>G06T 5/77<br>382/254</td></tr>
<tr><td>2014/0176732 A1</td><td>6/2014</td><td>Cohen et al.</td><td></td></tr>
<tr><td>2016/0100101 A1</td><td>4/2016</td><td>Cohen et al.</td><td></td></tr>
<tr><td>2016/0232426 A1</td><td>8/2016</td><td>Wang et al.</td><td></td></tr>
<tr><td>2017/0372461 A1 *</td><td>12/2017</td><td>Kim</td><td>G06T 7/90</td></tr>
<tr><td>2018/0025477 A1 *</td><td>1/2018</td><td>Min</td><td>G06T 11/60<br>345/590</td></tr>
<tr><td>2018/0300850 A1</td><td>10/2018</td><td>Johnson et al.</td><td></td></tr>
<tr><td>2019/0014884 A1</td><td>1/2019</td><td>Fu et al.</td><td></td></tr>
<tr><td>2019/0042882 A1 *</td><td>2/2019</td><td>Kim</td><td>G06N 3/045</td></tr>
<tr><td>2019/0370936 A1</td><td>12/2019</td><td>Zhang et al.</td><td></td></tr>
<tr><td>2021/0183033 A1 *</td><td>6/2021</td><td>Chung</td><td>G06V 40/161</td></tr>
<tr><td>2023/0125014 A1 *</td><td>4/2023</td><td>Kim</td><td>G06T 3/40<br>382/157</td></tr>
<tr><td>2023/0206617 A1 *</td><td>6/2023</td><td>Ban</td><td>G06V 10/7715<br>382/156</td></tr>
</table>

FOREIGN PATENT DOCUMENTS

<table>
<tr><td>CN</td><td>105825494 A</td><td>8/2016</td></tr>
<tr><td>CN</td><td>108171776 A</td><td>6/2018</td></tr>
<tr><td>CN</td><td>110349102 A</td><td>10/2019</td></tr>
<tr><td>KR</td><td>10-0606076 B1</td><td>7/2006</td></tr>
<tr><td>WO</td><td>2018/111786 A1</td><td>6/2018</td></tr>
</table>

OTHER PUBLICATIONS

Hu et al., "Exposure: A White-Box Photo Post-Processing Framework," arXiv:1709.09602v1 [cs.GR], Sep. 2017, Total 21 pages, XP080824105.

International Search Report (PCT/ISA/210) issued May 24, 2021 by the International Searching Authority in counterpart International Patent Application No. PCT/KR2021/001557.

Written Opinion (PCT/ISA/237) issued May 24, 2021 by the International Searching Authority in counterpart International Patent Application No. PCT/KR2021/001557.

Simone Bianco et al., "Artistic photo filter removal using convolutional neural networks: Artistic Photo Filter Removal Using CNNs", Journal of Electronic Imaging, vol. 27, Issue 1, Dec. 2017, 19 pages, DOI: 10.1117/1.JEI.27.1.011004.

Sheng-Yu Wang et al., "Detecting Photoshopped Faces by Scripting Photoshop", Proceedings of the IEEE/CVF International Conference on Computer Vision (ICCV), Oct. 2019, pp. 10072-10081.

Chunhui Jiang, "The Study of Pruning Methods of Deep Neural Network", University of Science and Technology of China, Oct. 2018, 107 pages.

Communication issued on Nov. 5, 2024 from the China National Intellectual Property Administration for Chinese Patent Application No. 202010600882.0.

Communication dated Mar. 17, 2025, issued by the Chinese National Intellectual Property Administration in Chinese Application No. 202010600882.0.

* cited by examiner de-filter template image         filter template image image to be processed         rendered image

IMAGE PROCESSING METHOD AND ELECTRONIC APPARATUS

CROSS-REFERENCE TO RELATED APPLICATIONS

This application is a continuation application of International Application PCT/KR2021/001557 filed on Feb. 5, 2021, which claims priority to Chinese Patent Application No. 202010087287.1, filed on Feb. 11, 2020, and Chinese Patent Application No. 202010600882.0, filed on Jun. 28, 2020, in the China National Intellectual Property Administration, the disclosures of which are incorporated by reference herein in their entireties.

BACKGROUND

1. Field

The present disclosure generally relates to a computer technology application field, an artificial intelligence field, and a digital image processing field, and more specifically, to an image processing method and electronic apparatus.

2. Description of Related Art

An image filter is a technology that performs processes, such as filtering, modifying, beautifying, and the like, on a color/hue/light of an image and the like through a computer technology and an image processing technology. Image filter is an important image processing technology, which is widely used in fields of image editing, video editing, mobile camera photography and the like.

Related art image filter technology typically includes a preset filter method, a custom filter method of adjusting parameters setting, and a custom filter method of generating a filter by selecting a filter image.

There exists a need to improve user experiences of the related art image filter technologies and image processing methods.

SUMMARY

According to an aspect of the disclosure, a method of image processing, includes: obtaining a first image; removing, using an image de-filter network, a filter effect applied to the first image to obtain a second image; obtaining, based on the first image and the second image, an image filter corresponding to the filter effect; and rendering a third image using the obtained image filter to output a fourth image.

The removing the filter effect may include: performing feature extraction on the first image, via cascaded feature extraction units of an encoder network of the image de-filter network, to generate an extracted feature map; and decoding the extracted feature map, via cascaded decoding units of a decoder network of the image de-filter network, to output the second image.

The performing the feature extraction on the first image may include: performing, using a portion of the cascaded feature extraction units other than a last feature extraction unit, at least one convolution process and at least one down-sampling process on an input feature map; and performing, using the last feature extraction unit, at least two convolution processes on the processed input feature map, residual-connecting of the input feature map and the convolution-processed input feature map, and outputting the extracted feature map to the decoder network, and the decoding the extracted feature map may include: performing at least one up-sampling process and at least one convolution process on the extracted feature map.

The removing the filter effect may further include: down-scaling, using a pre-processing layer, the first image according to a preset size; and outputting, to the encoder network, the down-scaled first image.

The removing the filter effect may further include: obtaining, from an image segmentation network, at least one type of segmentation information from among segmentation information for the first image; concatenating the first image with the at least one type of segmentation information to obtain at least one type of merged first image; and inputting, to the encoder network, the at least one type of merged first image.

The removing the filter effect may further include: concatenating, using at least one decoding unit of the decoder network, an up-sampled feature map with the convolution-processed input feature map corresponding to a same scale feature map; and performing at least one convolution process on the concatenated feature map.

The obtaining the image filter may include: obtaining a mapping relationship of transforming the second image to the first image; and obtaining the image filter according to the mapping relationship.

The obtaining the mapping relationship may include: acquiring a plurality of first sampling points in the first image and a plurality of second sampling points corresponding to respective first sampling points in the second image; and obtaining the mapping relationship of transforming the second image to the first image by determining mapping relationships between the respective first sampling points in the first image and the corresponding second sampling points in the second image.

The acquiring the plurality of first sampling points in the first image may include: detecting a salient target in the first image; acquiring a first portion of the plurality of first sampling points in a first area where the salient target is located in the first image; and acquiring a second portion of the plurality of first sampling points in a second area outside the salient target in the first image, and a first density of the first portion of the plurality of first sampling points may be greater than a second density of the second portion of the plurality of first sampling points.

The rendering the third image may include: determining a rendering degree of the third image, according to at least one of a scene similarity between the first image and the third image, and one or more human face areas in the third image; and rendering the third image using the image filter, according to the rendering degree of the third image.

The determining the rendering degree of the third image may include: determining rendering degrees of the one or more human face areas according to the one or more detected human face areas; detecting the scene similarity between the first image and the third image; and determining a rendering degree of another area, other than the one or more human face areas in the third image, according to the detected scene similarity.

The detecting the scene similarity between the first image and the third image may include: performing, using a scene classification network, scene classification on the first image and the third image; and determining the scene similarity of the first image and the third image, based on a scene classification result and features extracted by a set feature extraction layer in the scene classification network.

The determining the rendering degrees of the one or more human face areas may include: dividing each detected human face area of the one or more human face areas into a corresponding set of blocks; obtaining a human face color protection level of each block in the corresponding sets of blocks, according to a Gaussian distribution; and obtaining a rendering degree of each block in the corresponding sets of blocks, according to the human face color protection level of that block.

The rendering of the third image may include: fusing the third image and the fourth image based on the rendering degree of the third image to obtain a fifth image.

The obtaining of the image filter may include: segmenting the first image to obtain corresponding first segmented areas; acquiring an image filter corresponding to at least one first segmented area of the corresponding first segmented areas; and acquiring an image filter corresponding to the first image based on the image filter corresponding to the at least one first segmented area and the second image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

Related art image filters may be pre-set in software or apparatus. That is, various styles of image filter parameters may be pre-stored in the software or apparatus, and when the user calls an image filter function, the software or apparatus directly calls the stored image filter parameters for calculation, to output the image filtered image. For example, the user can select a color filter function, a nostalgic filter function, a sketch filter function and the like. However, although such a preset filter method has a good filter effect, a number of image filters is limited, and which is difficult to meet the user's growing demand for personalized image filters.

Alternatively or additionally, related art image filters may also provide for user-defined image filters. For example, some image editing functions support user-defined (e.g., personalized) image filters. That is, the user can adjust parameters of the image filters to generate custom image filters. This mode may require users to have some basic knowledge of image processing and experience in image filters to generate a good effect of custom image filter. However, it may be difficult for most users with zero foundation to bring up a better effect of the image filter. Thus, the user experience may not be satisfactory.

With respect to the preset image filter method based on the related art image filter technologies that may not meet the user's demand for personalized custom image filters, the related art methods for generating custom image filter based on modifying image filter parameters may require users to have certain image processing technology foundation and image filter technical knowledge. The present disclosure proposes an image processing method and electronic apparatus for obtaining an image filter based on an image de-filter network. Alternatively or additionally, the proposed image processing method and the electronic apparatus may also adjust a rendering degree of the image filter in consideration of a scene similarity and human face areas, such that the effect of the image filter can be improved when compared to related art image filter technologies.

The image processing method and the electronic apparatus according to embodiments of the present disclosure is described in detail below with reference to FIGS. 1 to 15.

Figure 1:
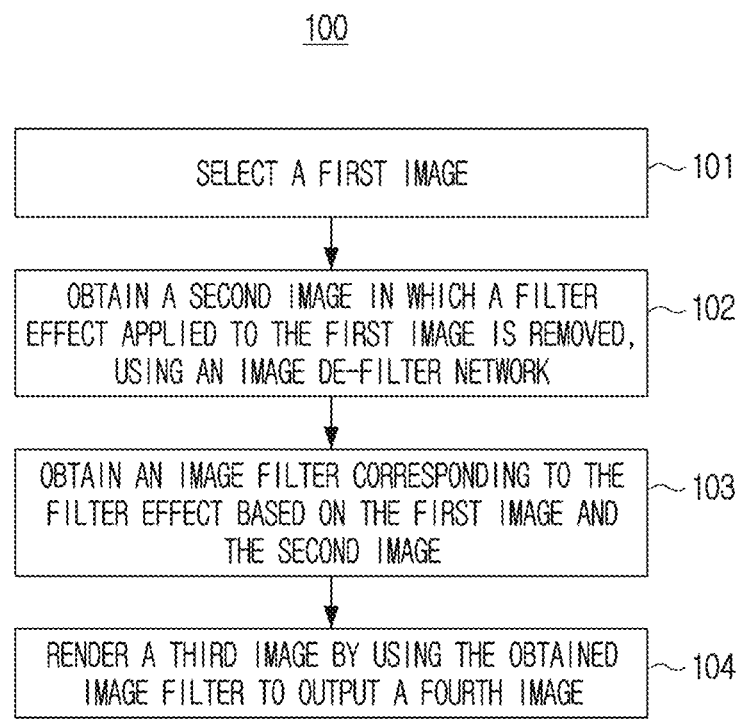
FIG. 1 is a flowchart illustrating a method of image processing according to an embodiment of the present disclosure.

FIG. 1 is a flowchart illustrating a method 100 of image processing according to an embodiment of the present disclosure.

At step 101, a first image is selected by a user, wherein the first image may be any image input by the user. For example, the first image may be acquired based on the selection from the user. Here, the first image refers to an image of which the user wishes to obtain a filter effect, and therefore, hereinafter, the first image may be referred to as a filter template image.

According to the embodiment of the disclosure, the filter template image may be any image, selected by the user, of which a style or an effect is desired to be obtained. Specifically, the filter template image is not necessarily an image with filter effect, but also an image without filter effect. As long as the user wishes to obtain a style or an effect of an image, the user may select that image as the filter template image.

According to an embodiment of the present disclosure, the filter template image may be acquired from a local storage or a local database, or received from an external data source (e.g., the Internet, a server, a database, etc.) through an input device or a transmission medium, as needed.

At step 102, a second image in which a filter effect applied to the first image is removed is obtained, using an image de-filter network. Hereinafter, the second image may also be referred to as a de-filter template image. In the following, a step of generating the second image with the de-filter effect corresponding to the first image using the image de-filter network is specifically described first.

According to an embodiment of the present disclosure, the image de-filter network may be a deep convolutional neural network. Convolutional Neural Networks (CNNs) are a type of Feedforward Neural Networks (FNNs) that includes convolution calculations and has a deep structure, which is one of representative algorithms of deep learning. The CNNs may be constructed by imitating a biological visual perception mechanism, and can perform supervised learning and unsupervised learning. In the CNNs, convolution kernel parameters sharing in hidden layers and sparsity of connection between layers enable the CNNs learn grid-like topology features, such as pixels and audio, in a small amount of computation, which has a stable effect, and has no additional feature engineering requirements for data.

The CNNs generally include an input layer, a hidden layer, and an output layer, wherein the hidden layer of the CNNs include constructions of a convolutional layer, a normalization layer, an up-sampler layer and the like. The Deep Convolutional Neural Networks (DCNNs) refers to deeper convolutional neural networks with more than 3 layers. The DCNNs proposed by various embodiments of the present disclosure may have more than 3 layers, and include an input layer, convolutional layers, normalization layers, a convolutional layer and a normalization layer with a skip connection structure, up-sampler layers, and an output layer. A function of each layer of the DCNNs is described in detail below.

Input layer: the input layer of the DCNNs can process multi-dimensional data. Commonly, the input layer of one-dimensional (1D) convolutional neural network receives 1D or two-dimensional (2D) array, wherein the 1D array is usually time or spectrum sampling, the 2D array may contain multiple channels, the input layer of 2D convolutional neural network receives 2D or 3D array, the input layer of 3D convolutional neural network receives 4D arrays. Since CNNs are widely used in a computer vision field, many studies presuppose 3D input data, that is, 2D pixel points on a plane and RGB channels, when introducing their structures. The input layer of the DCNNs proposed by various embodiments of the present disclosure may be used to input a filter template image.

Convolutional layer: the function of DCNNs is to perform feature extraction on the input data, which contains multiple convolution kernels therein. Each element constituting the convolution kernels corresponds to a weight coefficient and a bias vector, which is similar to a neuron of one FNN. Each neuron within the convolutional layer is connected to multiple neurons in an area which is close to the neuron in a previous layer, and a size of the area depends on a size of the convolution kernel, which can be referred to a "receptive field" and the meaning thereof can be compared to the receptive field of visual cortical cells. The convolution kernel, when working, will scan through the input features regularly, and within the receptive field, perform matrix elements multiplication and summation for the input features and superimpose deviation.

Convolutional layer parameters include a size of convolution kernel, a step size, and padding, which jointly determine a size of feature map output by the convolutional layer and are hyper-parameters of the convolutional neural network, wherein the size of the convolution kernel can be specified as any value smaller than a size of an input image, and the larger the convolution kernel is, the more complex the input features can be extracted. The convolution step size defines a distance of the positions when the convolution kernel scans through the feature map twice adjacent to each other. When the convolution step is 1, the convolution kernel will scan the elements of the feature map one by one, and when the convolution step is n, the convolution kernel will skip n−1 pixels at the next scan. Padding is a method of artificially increasing the size of the feature map before it passes through the convolution kernel to offset an effect of size shrinkage during calculation. Common padding methods are padding by 0 and padding by replicating boundary value (replication padding).

The convolutional layer contains excitation functions to assist in expressing complex features. Similar to other deep learning algorithms, convolution neural network often use a linear rectifier function (e.g., Rectified Linear Unit (ReLU)).

Normalization layer: in a deep network, as the input data is transferred step by step in the hidden layer, its mean value and standard deviation will change, resulting in covariate shift phenomenon. Covariant shift is considered as one of reasons of vanishing gradient in the deep networks. The normalization layer partially solves such a problem at the cost of introducing additional learning parameters, in which the strategy is to standardize features in the hidden layer first, and then amplify the normalized features as new inputs, using two linear parameters. The neural network will update normalization layer parameters of the normalization layer during the learning process. The normalization layer parameters in the convolutional neural network have the same properties as the convolution kernel parameters, that is, pixels of a same channel in the feature map share a set of normalization layer parameters. General normalization layer may use Batch Normalization. Batch Normalization normalizes features on a training batch, and ensures consistent data distribution. The present disclosure may use Instance Normalization in order to improve the effect of the proposed deep convolution neural network. Instance Normalization normalizes features on image pixels, the effect of which may be obvious in the stylization migration.

Up-sampler layer: up-sampler is also called as image enlarging or image interpolation. An up-sampler interpolation method used in a deep neural network proposed in various embodiments of the present disclosure is the nearest neighbor method, which is a simplest kind of interpolation method. The nearest neighbor method does not need to calculate an average value or generate an intermediate value based on complicated rules. Instead, for example, given four neighbor pixels of a pixel to be processed, a gray scale of a neighbor pixel closest to the pixel to be processed is assigned to the pixel to be processed.

Output layer: the output layer is a last layer of the neural network, and generally has different output forms according to different tasks. The output layer of a deep neural network proposed in various embodiments of the present disclosure is used to output a feature map with a same size as the input image.

Skip connection structure: in order to improve the performance of the deep convolutional neural network, skip connection is generally added to the network. Skip connection or shortcut connection is derived from skip connection and various gating algorithms in recurrent neural network (RNN), which is technique used to alleviate a problem of gradient disappearance in deep structures. The skip connection in the convolutional neural network can span any number of hidden layers, which is illustrated by skip between adjacent hidden layers as shown in Equation 1.

$$A^l = f(Z^l + uZ^{l-1})$$ [Equation 1]

In Equation 1, $Z^l$ represents the l-th feature (a convoluted feature), $Z^{l-1}$ represents (l-1)-th feature (a convoluted feature), f is the activation function and A is an activated feature, u is a conversion coefficient of a feature map. When sizes of $Z^l$ and $Z^{l-1}$ are different, the conversion coefficient converts the feature map with smaller size, generally converts $Z^{l-1}$ to the size of $Z^l$, to make sure that the operations of the matrix elements work. When an output value of $Z^l$ is small and an output value of $Z^{l-1}$ is big, the output of the convolutional layer l approximates an equivalent function and has no negative effect on a feature transfer of the layer. Thus, a learning baseline of the l layer is set, so that the layer does not degenerate at least in iteration. In the back propagation (BP) framework, some errors can skip layer l to directly act on layer l-1 when back propagation compensates for a gradient loss caused by stepwise propagation in the deep structure. Therefore, it may be beneficial to an error propagation of the deep structure. A combination of multiple convolutional layers including the skip connection may be referred to as a residual block.

According to an embodiment of the present disclosure, the image de-filter network may be a U-NET type of deep convolutional neural network. It may be understood that the image de-filter network is not limited thereto, and may also comprise other artificial neural networks. The U-NET is a fully convolutional network that includes multi-layer down-sampling and multi-layer up-sampling, and its characteristic is that the convolutional layers in the down-sampling part and the up-sampling part are completely symmetric. The feature map at the down-sampling end can skip deep layer sampling and be concatenated to the corresponding up-sampling end. In some embodiments, the sizes of the input layer and the output layer of the network may be the same. The U-NET type of CNNs are Fully Convolutional Networks (FCNs) organized under the encoder-decoder paradigm. The U-NET type of deep convolutional neural network proposed by various embodiments of the present disclosure may also be referred to as an Encoder-Decoder Network. The image de-filter network proposed by various embodiments of the present disclosure, may be a U-NET type of deep convolutional neural network, and may be designed to include an input layer, convolutional layers and normalization layers, a down-sampling layers, a convolutional layer and a normalization layer with the skip connection structure, up-sampling layers and an output layer.

Figure 2:
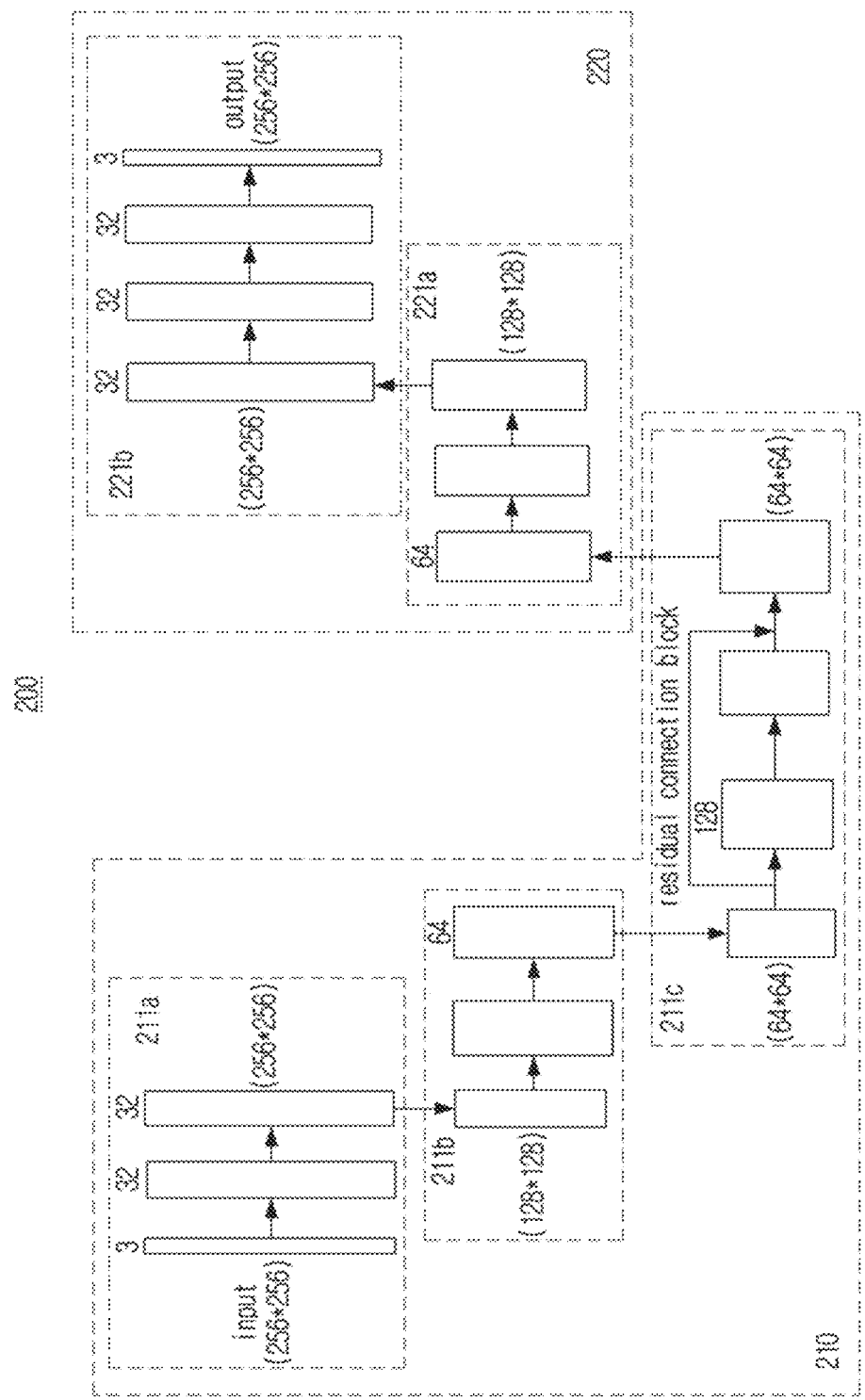
FIG. 2 illustrates a schematic diagram of a structure of an image de-filter network according to an embodiment of the present disclosure.

FIG. 2 illustrates a schematic diagram of a structure of an image de-filter network according to an embodiment of the present disclosure.

In order to improve processing speed and reduce storage space, the present disclosure proposes an image de-filter network that improves the U-NET type of network. Compared with related art U-NET networks, the U-NET type of network proposed by the present disclosure can reduce an image size, a number of pooling operations, and a number of channels, increase skip connection structures (e.g., residual connection blocks), and remove a copy and crop structure.

Specifically, referring to FIG. 2, the image de-filter network 200 according to an embodiment of the present disclosure may include an encoder network 210 and a decoder network 220.

The encoder network 210 performs feature extraction on the first image via several cascaded feature extraction units (e.g., 211a, 211b, and 211c, hereinafter "211" generally). According to an embodiment of the present disclosure, a last feature extraction unit 211 (e.g., 211c) in the encoder network 210 performs convolution processing on the input feature map at least twice, and outputs after residual-connecting the input feature map and the convolved feature map for outputting, and other feature extraction units 211 (e.g., 211a, 211b) perform convolution process at least once and down-sampling process at least once on the input feature map.

For example, but not limited to, the encoder network 210 may include three feature extraction units 211a, 211b, and 211c. The first feature extraction unit 211a may include an input layer for receiving the input first image, and includes two convolution layers for performing convolution process on the input first image twice, wherein a size of a convolution kernel for the first convolution process is 7×7, a size of a convolution kernel for the second convolution process is 3×3, and a convolution step length of each convolution process is 1. Alternatively or additionally, the first feature extraction unit 211a may further include two normalization layers for performing normalization process after each convolution process, and instance normalization process may be used. The first feature extraction unit 211a may include a down-sampling layer for performing down-sampling (pooling) process on the feature map after convolution process or normalization process (e.g., maximum 2×2 pooling can be performed), and outputting a down-sampled feature map, wherein 211a contains three arrows, the first arrow represents that 7×7 convolution process is performed on the input 64×64 image to output the feature map, and the second arrow represents that 3×3 convolution process is performed on the above-described output feature map, and the third arrow represents that down-sampling process (also called as pooling process) is performed on the 3×3 convolution processed feature map and a 128×128 feature map is output. The second feature extraction unit 211b may include two convolution layers for performing convolution process twice on the feature map output by the first feature extraction unit 211a, wherein a size of a convolution kernel for each convolution processing is 3×3, a convolution step length of each convolution process is 1. Alternatively or additionally, the second feature extraction unit 211b may also include two normalization layers for performing normalization process after each convolution process, and instance normalization process may be used.

The second feature extraction unit 211b may include a down-sampling layer for performing down-sampling (pooling) process on the convolution processed or normalization processed feature map (e.g., maximum 2×2 pooling can be performed), and output a down-sampled feature map, wherein 211b contains three arrows, the first and second arrows represent that 3×3 convolution process is performed twice in sequence on the 128×128 feature map output by the first feature extraction unit 211a, and the third arrow represents that the down-sampling process (also called as pooling process) is performed on the 3×3 convolution processed feature map, and a 64×64 feature map is output.

The third feature extraction unit 211c may include a convolutional layer with a skip connection structure. That is, in addition to performing convolution process three times on the feature map output by the second feature extraction unit 211b (wherein, a size of a convolution kernel of each convolution processing is 3×3, and a convolution step length of each convolution process is 1), the feature map output by the second feature extraction unit 211b (that is, the 64×64 feature map shown in the FIG. 2) is also output to the feature map after convolution processed three times in order to perform residual connection and then the residual connected feature map is output. For example, the feature map output by the second feature extraction unit 211b and the feature map after convolution processed three times are merged and output, then the feature map output by the third feature extraction unit 211c not only includes the feature map convolution processed by the third feature extraction unit 211c, but also includes the feature map of more upper layer before the convolution process. Alternatively or additionally, the third feature extraction unit 211c may also include three normalization layers for further performing normalization processing after each convolution processing, and instance normalization process may be used.

The decoder network 220 decodes the extracted feature map via several cascaded decoding units 221 (e.g., 221a, 221b, hereinafter "221" generally) to obtain the second image. According to an embodiment of the present disclosure, the decoding unit 221 in the decoder network performs at least one up-sampling process and at least one convolution process on the input feature map.

For example, but not limited to, the decoder network 220 may include two decoding units 221a and 221b. The first decoding unit 221a may include an up-sampling layer for receiving the feature map output from the encoder network 210, and performing up-sampling on the feature map once (e.g., an up-sampling coefficient may be 2). The first decoding unit 221a may include two convolution layers for performing convolution process twice on the up-sampled feature map, wherein a size of a convolution kernel for each convolution process is 3×3, and a convolution step length for each convolution process is 1. As shown in FIG. 2, the first decoding unit 221a contains three arrows, the first arrow represents the up-sampling process that is performed on the feature map output by the encoder network 210, the second and third arrows represent that 3×3 convolution process is performed twice in sequence on the feature map obtained by up-sampling, and a 256×256 feature map is output. Alternatively or additionally, the first decoding unit 221a may further include two normalization layers for performing normalization processing after each convolution processing, and instance normalization process may be used. The first decoding unit 221a may output the convolution processed or normalization processed feature map.

The second decoding unit 221b may include an up-sampling layer for performing up-sampling once on the feature map output by the first decoding unit 221a (e.g., an up-sampling coefficient may be 2). The second decoding unit 221b may include three convolutional layers for performing convolution process three times on up-sampled feature map, wherein a size of a convolution kernel for each convolution processing is 3×3, and a convolution step length of each convolution processing is 1. As shown in FIG. 2, the second decoding unit 221b contains four arrows, the first arrow represents the up-sampling process that is performed on the 256×256 feature map output by the first decoding unit 221a, the second, third and fourth arrows represent 3×3 convolution process is performed three times in sequence on the feature map obtained by up-sampling, and a 256×256 image is output. Alternatively or additionally, the first decoding unit 221a may also include three normalization layers for performing normalization processing after each convolution processing, and instance normalization process may be used. The second decoding unit 221b may include an output layer for outputting the convolution processed or normalization processed feature map as the second image.

The image de-filter network structure shown in FIG. 2 is only an embodiment of an improved U-NET type of the network proposed by various embodiments of the present disclosure. The improved U-NET type of the network proposed by the various embodiments of the present disclosure is not limited thereto, and may also include an adjustable number of convolution process, down-sampling process and up-sampling process, etc.

Alternatively or additionally, the image de-filter network 200 proposed by various embodiments of the present disclosure may also include a pre-processing layer (not shown). The pre-processing layer may down-scale the first image according to a preset size (such as 256×256), and output the down-scaled image to the encoder network 210. The image de-filter network 200 proposed by the present disclosure can achieve the effect of reducing the size of the image to increase a computing speed.

The image de-filter network 200 proposed by various embodiments of the present disclosure can use a smaller storage space on a mobile device (e.g., the de-filter network model can be 6.5 MB) and run faster (e.g., only need 60 ms to generate a de-filter image), and can use any image as the first image to generate the second image with de-filter effect. Alternatively or additionally, in the image de-filter network proposed in the present disclosure, the copy and crop structure is deleted. After the structure is deleted, the image de-filter network can still maintain good performance and increase the processing speed.

Alternatively or additionally, in the image de-filter network proposed by the present disclosure, the number of channels in each convolutional layer can be correspondingly reduced, or the number of pooling layer operations can be reduced (e.g., reduced from 4 to 2) to improve processing speed of the network while ensuring network performance.

Figure 3:
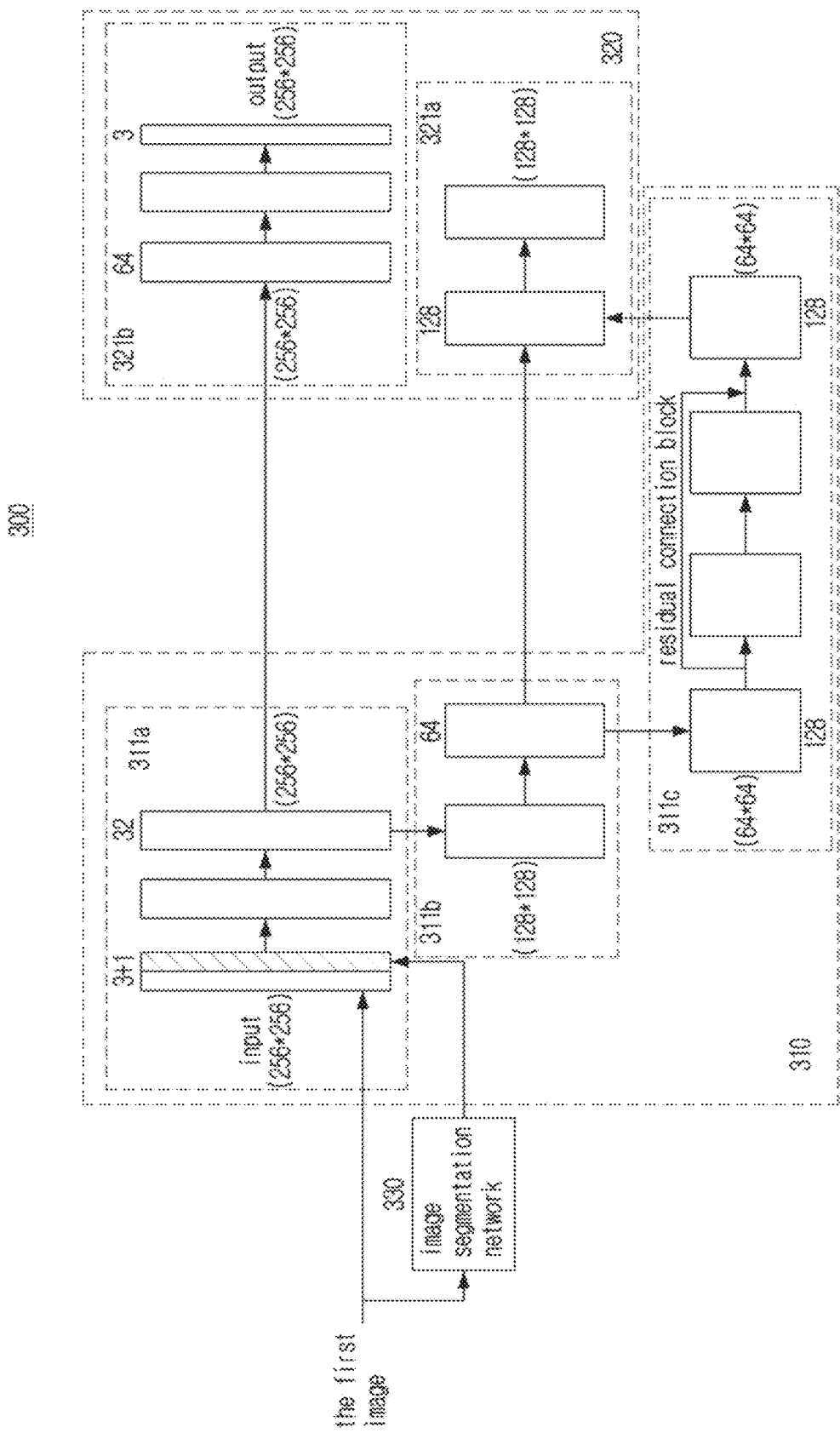
FIG. 3 illustrates a schematic diagram of a structure of another image de-filter network according to an embodiment of the present disclosure.

FIG. 3 illustrates a schematic diagram of a structure of another image de-filter network according to an embodiment of the present disclosure.

Compared with using only a single filter for the entire image, using different types of suitable filters for different parts of the image can achieve a better filter effect. For example, a person in the image is suitable for a person filter, and a sky in the image is suitable for a sky filter. Therefore, another improved image de-filter network proposed by the present disclosure can generate different suitable de-filter effects for different segmentation categories (e.g., character parts, sky parts). For this, a channel of segmentation information (e.g., the image segmentation result map) (twill block) is added to the input layer of the image filter network in FIG. 3 newly, to allow the image segmentation result to constrain the de-filter process, to enable each different segmentation part generate a different de-filter effect in the image output by the image de-filter network in FIG. 3. Here, the image segmentation may be semantic segmentation, that is, the image is segmented according to the categories of the image content (e.g., the person part, the sky part). It may be understood that the image segmentation may also be other possible segmentation, and the present disclosure does not limit the manner of image segmentation. Copy and crop operations or copy operation may also added to the image de-filter network in FIG. 3, to allow global information of upper layers in the encoder network to be transferred to the decoder network, and to make the semantic information constraint the de-filter process better.

Specifically, referring to FIG. 3, the image de-filter network 300 according to an embodiment of the present disclosure may include an encoder network 310, a decoder network 320, and an image segmentation network 330, wherein the functions of the encoder network 310 and the decoder network 320 are similar to the functions of the encoder network 210 and the decoder network 220 described with reference to FIG. 2. The decoder unit 321 in decoder networks 320 may differ from decoder unit 211 in that the decoder unit 321 may combine the up-sampled feature maps with the convolution processed feature maps by the feature extraction units 310 of corresponding same scale feature maps in encoder network 310, and perform convolution process at least once on the combined feature map.

Alternatively or additionally, the image segmentation network 330 may obtain at least one type of segmentation information in the segmentation information for the first image, merge the first image with the at least one segmentation information, obtain at least one type of merged first image, and input the at least one type of merged first image to the encoder network. Alternatively or additionally, the image segmentation network 330 may obtain at least one type of segmentation information in the segmentation information for the first image, connect (or merge) the first image with the at least one type of segmentation information, and input at least one of the connected (or merged) first images to the encoder network. According to an embodiment of the present disclosure, the image segmentation network 330 may be a semantic segmentation network. Here, the segmentation information refers to information related to a segmentation result obtained by segmenting the image, and the information related to the segmentation result may be the predicted category value of each pixel, for example, information about which category each pixel in the image belongs to, and may also be information about a number of categories, information about areas belonging to each category, and the like. Wherein, merging the first image with the at least one type of segmentation information may be adding respective channels in the first image to the channel in the segmentation information, for example, the size of the first image is 256×256×3 (3 is the number of channels), the size of segmentation information is 256×256×1 (1 is the number of channels), and after merging, 256×256×4 (4 is the number of channels) input image may be generated.

Specifically, the image segmentation network 330 may segment the image according to different rules, or the segmentation information can have different representation methods, thus variety types of segmentation information may be obtained for a same image. For example, when there are two people in the image, one type of segmentation information can indicate that an area where the two people are located belongs to the category "person", and the other type of segmentation information may indicate that an area where the first person is located belongs to the category "man", and an area where the second person is located belongs to the category "woman". That is, the segmentation category here may be defined differently according to user requirement.

Alternatively or additionally, the image segmentation network 330 may concatenate the first image with the at least one type of segmentation information, and input at least one of the concatenated first images to the encoder network. As shown in FIG. 3, the input of the encoder network 310 may be a first image (3+1) in which the first image is concatenated with the segmentation information.

The operations of the encoder network 310 and the decoder network 320 are described below with reference to FIG. 3.

For example, but not limited to, the encoder network 310 may include three feature extraction units 311a, 311b, and 311c. The first feature extraction unit 311a may include an input layer for receiving a first image in which the input first image and the segmentation information is merged. The first feature extraction unit 311a may include two convolutional layers for performing convolution process twice on the input merged first image, wherein a size of a convolution kernel of a first convolution process is 7×7, and a size of a convolution kernel of a second convolution process is 3×3, and a convolution step length of each convolution processing is 1. Alternatively or additionally, the first feature extraction unit 311a may also include two normalization layers for performing normalization process after each convolution process, and instance normalization process may be used. The first feature extraction unit 311a may include a down-sampling layer for performing down-sampling (pooling) process on the convolution processed or normalization processed feature map (e.g., maximum 2×2 pooling can be performed), and outputting the down-sampled feature map.

The second feature extraction unit 311b may include one convolution layer for performing convolution process once on the feature map output by the first feature extraction unit 311a, wherein a size of a convolution kernel is 3×3, and a convolution step size is 1. Alternatively or additionally, the second feature extraction unit 311b may further include a normalization layer for performing normalization process after convolution process, and instance normalization process may be used. The second feature extraction unit 311b may include a down-sampling layer for performing down-sampling (pooling) process on the convolution processed or normalization processed feature map (e.g., maximum 2×2 pooling can be performed), and outputting the down-sampled feature map.

The third feature extraction unit 311c includes a convolutional layer having a skip connection structure, that is, in addition to performing convolution process three times on the feature map output by the second feature extraction unit 311b (wherein, a size of a convolution kernel for each convolution process is 3×3, and a convolution step length of each convolution process is 1), the feature map output by the second feature extraction unit 211b is output to the three times of convolution processed feature map, in order to perform residual connection, and the residual connection processed feature map is output. Alternatively or additionally, the third feature extraction unit 311c may also include three normalization layers for performing normalization processing after each convolution process, and instance normalization process may be used.

Alternatively or additionally, the decoder network 320 may include two decoding units 321a and 321b. The first decoding unit 321a may include an up-sampling layer for receiving the feature map output from the encoder network 310, and performing up-sampling once on the feature map (e.g., an up-sampling coefficient may be 2), and includes a convolution layer for merging the up-sampled feature map with the feature map convolution processed or normalization processed by the second feature extraction unit 311b (i.e., copy and cut process, or copy process), and performing convolution process once on the merged feature map, wherein a size of a convolution kernel is 3×3, and a convolution step size is 1. Alternatively or additionally, the first decoding unit 321a may also include a normalization layer for performing normalization process after the convolution process, and instance normalization process may be used. The first decoding unit 321a may output the convolution processed or normalization processed feature map. The second decoding unit 321b may include an up-sampling layer for performing up-sampling once on the feature map output by the first decoding unit 221a (e.g., an up-sampling coefficient may be 2), and include convolution layers for merging the up-sampled feature map with the feature map that is convolution processed or normalization processed by the first feature extraction unit 311a (i.e., copy and cut process, or copy process), and performing convolution process twice on the merged feature map, wherein a size of a convolution kernel for each convolution process is 3×3, and a convolution step size for each convolution process is 1. Alternatively or additionally, the first decoding unit 321a may further include normalization layers for performing normalization process after each convolution process, and instance normalization processing may be used. The second decoding unit 321b may include an output layer for outputting the convolution processed or normalization processed feature map as the second image.

According to an embodiment of the present disclosure, the image de-filter network proposed by the present disclosure may be trained, using a training image set including a plurality of images with filter effects (filter images) and a plurality of corresponding images in which filter effects are removed (that is de-filter images) (i.e., multiple image pairs, each image pair includes a filter image and a de-filter image corresponding to the filter image), and the de-filter template image corresponding to the filter template image may be generated using the trained image de-filter network. Alternatively or additionally, in order to train the network considering image segmentation result, the training image set may be appropriately modified. For example, the de-filter images in the training image set are obtained using different appropriate de-filter process on the corresponding filter images according to different semantic segmentation categories.

Returning to FIG. 1, at step 103, an image filter corresponding to the filter effect is obtained based on the first image and the second image. After the second image (de-filter template image) is obtained, a mapping relationship of transforming the second image (de-filter template image) to the first image (filter template image) may be calculated, and the calculated mapping relationship may be used as the image filter.

According to an embodiment of the present disclosure, the mapping relationship of transforming the de-filter template image to the filter template image may be calculated based on image attributes of the filter template image and the de-filter template image. For example, the mapping relationship of transforming the de-filter template image to the filter template image may be calculated based on color attributes of the filter template image and the de-filter template image.

Figure 4:
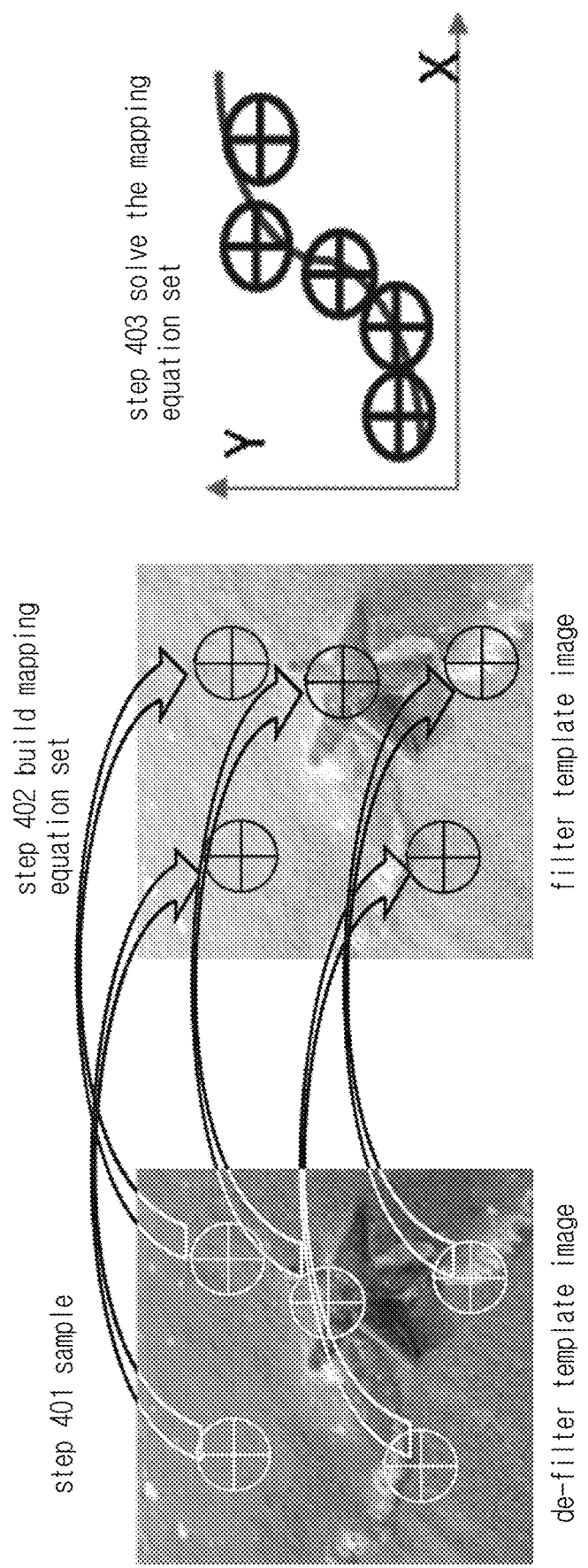
FIG. 4 is a schematic diagram illustrating acquiring a mapping relationship for transforming a de-filter template image to a filter template image according to an embodiment of the present disclosure.

For example, FIG. 4 is a schematic diagram illustrating acquiring the mapping relationship of transforming the de-filter template image to the filter template image according to an embodiment of the present disclosure.

As shown in FIG. 4, at step 401, the filter template image and the de-filter template image is equally sampled to obtain multiple sampling point pairs. Specifically, multiple sampling points in the filter template image and multiple sampling points in the de-filter template image corresponding to the multiple sampling points in the filter template image may be acquired.

For example, the filter template image and the de-filter template image may be uniform random sampled to obtain multiple first sampling points in the filter template image and multiple second sampling points in the de-filter template image corresponding to respective first sampling point in the filter template image respectively. Specifically, uniform sampling points of the filter template image and the de-filter template image may be obtained by performing uniform random sampling on the filter template image and the de-filter template image using a uniform random sampling method. The uniform sampling points of the filter template image and the uniform sampling points of the de-filter template image correspond one-to-one in position. For example, N uniform sampling points of the filter template image and N uniform sampling points of the de-filter template image may be obtained, wherein N may be equal to or greater than 4000. It may be understood that the number of N is not limited to these values.

For another example, because a salient target in the image is very important and may attract more of the user's attention, the extraction of more sampling points for the salient target in the image may make the image filter more in line with the human visual psychology and more focus on the effect of the salient target, thereby improving the performance of image filters. In other words, a density of the first sampling points in the area where the salient target is located (a number of first sampling points per unit area) may be greater than the density of the first sampling points in the area outside the salient target. Therefore, larger sampling weight may be applied to salient target areas in the image, and smaller sampling weight can be applied to other areas. For example, it is assumed that N pairs of sampling points are collected in the filter template image and the de-filter template image. Salient target in the filter template image is extracted, for example, salient target may be detected and extracted using a salience detection network. Salient detection network refers to neural network model which is trained to detect salient object and give more sampling rate to the salient object.

N×T points (T>0.5) are sampled in the area where the salient target of the filter template image is located and the corresponding position of the de-filter template image, wherein T may be an extraction ratio (i.e., the sampling weight), and N×(1−T) points are sampled in the area outside of the salient target of the filter template image and the corresponding position of the de-filter template image. Therefore, the sampling weight for the area where the salient object is located in the image is greater than the sampling weight for the area outside of the salient target. That is, the more sampling points are extracted in the area where the salient target is located in the image, wherein N may be equal to or greater than 4000. It may be understood that the number of N is not limited to this. T may be set according to factors of user requirement, image features and the like. For example, a ratio t of the area where the salient target is located in the image may be calculated, and T may be set to 0.5+0.5t. Alternatively or additionally, the uniform random sampling method may be applied to the sampling of both the area where the salient target is located and the area outside of the salient target in the image.

Figure 5:
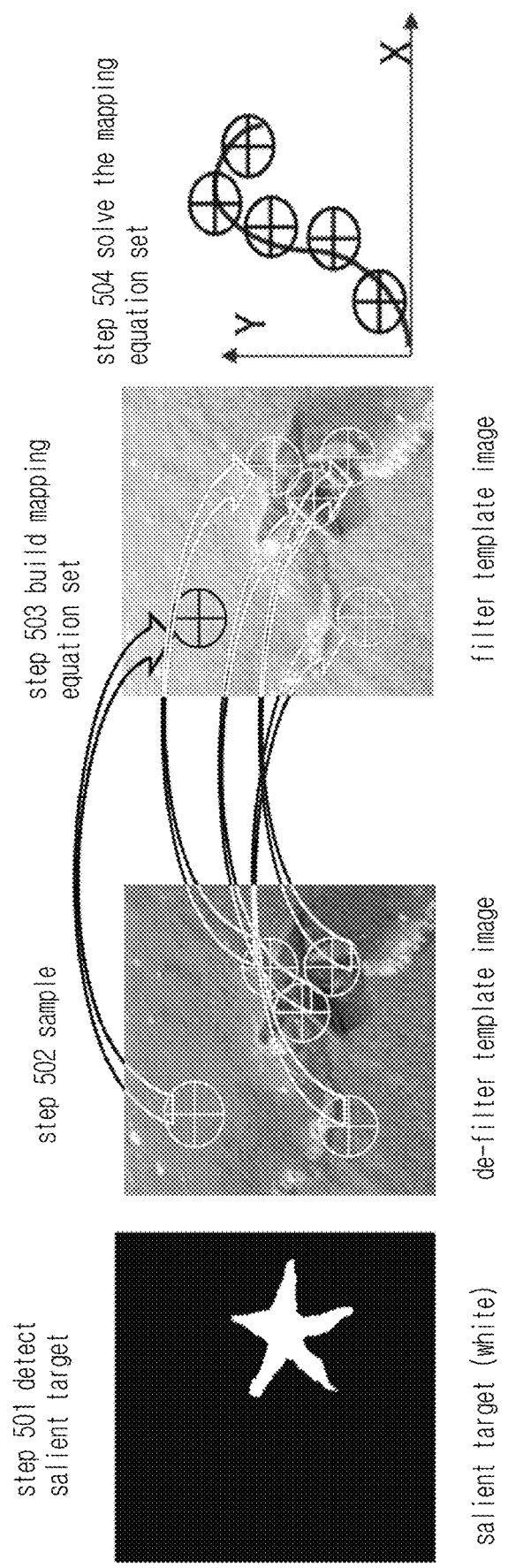
FIG. 5 is a schematic diagram illustrating acquiring a mapping relationship for transforming a de-filter template image to a filter template image in consideration of the salient target in the filter template image and the de-filter template image according to an embodiment of the present disclosure.

FIG. 5 is a schematic diagram illustrating acquiring the mapping relationship of transforming the de-filter template image to the filter template image, in consideration of the salient targets in the filter template image and the de-filter template image according to an embodiment of the present disclosure.

As shown in FIG. 5, at step 501, salient targets, for example, starfish (white area) in the image, in the filter template image and the de-filter template image are detected.

At step 502, the filter template image and the de-filter template image are sampled in such a way that the sampling density of the salient target area (starfish area) is higher than that of the other areas (sea water area and beach area).

At step 503, a mapping equation set is built based on the sample point pairs of the filter template image and the de-filter template image. At step 504, the built mapping equation set is solved to obtain the mapping relationship of transforming the de-filter template image to the filter template image. This is described in detail below.

For another example, different parts in the image (e.g., different parts obtained by segmenting the image) may be considered to be sampled differently, and a mapping relationship may be generated for each part and/or an entire mapping relationship may be generated for all parts, thereby generating multiple image filters, so that different appropriate image filters are used for different parts of the image to enhance the performance of the image filters. For example, it is assumed that N pairs of sampling points are collected in the filter template image and the de-filter template image. The filter template image is segmented into multiple different parts, for example, the filter template image is segmented into multiple different parts through semantic segmentation. N×r points are sampled in each segmented part of the filter template image and the corresponding position of the de-filter template image (r is a ratio of the area of the segmented part to the total image area, r>=0.1), wherein N may be equal to or greater than 4000. It may be understood that the number of N is not limited to this. Alternatively or additionally, the uniform random sampling method may be applied to the sampling of each segmented part in the image.

Figure 6:
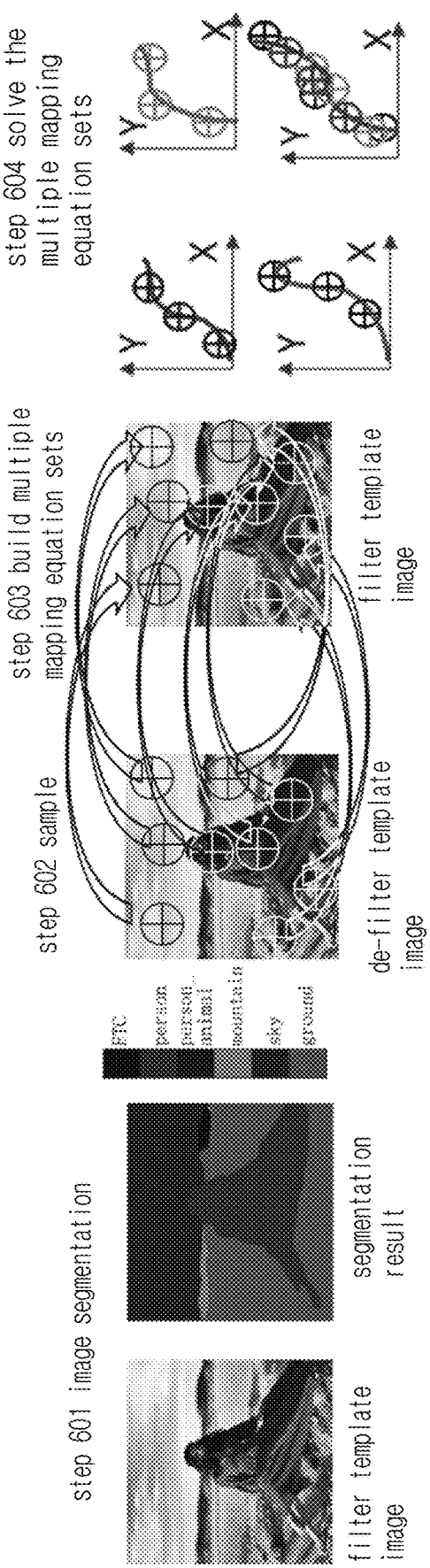
FIG. 6 is a schematic diagram illustrating acquiring a mapping relationship for transforming a de-filter template image to a filter template image in consideration of areas of different categories in the filter template image and the de-filter template image according to an embodiment of the present disclosure.

FIG. 6 is a schematic diagram illustrating acquiring a mapping relationship of transforming the de-filter template image to the filter template image in consideration of different categories of areas in the filter template image and the de-filter template image according to an embodiment of the present disclosure.

As shown in FIG. 6, at step 601, image segmentation is performed on the filter template image to obtain different categories of areas.

At step 602, different categories of areas of the filter template image and the de-filter template image are differently sampled. For example, sampling may be performed according to ratios of the different categories of areas to the total image area, respectively.

At step 603, respective mapping equation sets are built based on the sample point pairs of different categories of areas of the filter template image and the de-filter template image, respectively, and an entire mapping equation set is built based on the sample points pairs of all areas of the filter template image and the de-filter template image. At step 604, the respective built mapping equation sets are solved to obtain mapping relationships of the de-filter template image to the filter template image, of respective different categories of areas, and the built total mapping equation set is solved to obtain the entire mapping relationship of transforming the de-filter template image to the filter template image. This is described in detail below. Subsequently, the mapping relationship of transforming the de-filter template image to the filter template image may be calculated by calculating the color mapping relationship between all the multiple sampling points in the filter template image and all the corresponding multiple sampling points in the de-filter template image, and the image filter is obtained according to the mapping relationship.

According to an embodiment of the present disclosure, the first image (e.g., filter template image) may be segmented to obtain respective first segmented areas. For at least one first segmented area, an image filter corresponding to the at least one first segmented area is obtained. An image filter corresponding to the first image is obtained based on the image filter corresponding to the at least one first segmented area and the second image (e.g., de-filter template image). Wherein, for at least one first segmented area, a plurality of first sampling points in the at least one first segmented area and a plurality of second sampling points corresponding to the plurality of first sampling points respectively in the second image are acquired, and the image filter corresponding to the at least one first segmented area is acquired by determining the mapping relationship between the respective first sampling points in the at least one first segmented area and the corresponding second sampling points in the second image. In other words, for the case of segmenting the filter template image and the de-filter template image into multiple different parts and sampling according to each segmented part, the mapping relationship of transforming the de-filter template image to the filter template image of each segmented part may be calculated by the color mapping relationship between the multiple sampling points of the filter template image and the corresponding multiple sampling points in the de-filter template image of each segmented part, thereby obtaining multiple mapping relationships, and/or an entire mapping relationship of transforming the de-filter template image to the filter template image of all segmented parts may be calculated by the color mapping relationship between all the sampling points of the filter template image and all the sampling points in the de-filter template image of all the segmented parts.

In the following, a method for determining the mapping relationship between the first sampling points and the second sampling points according to an embodiment of the present disclosure is introduced.

According to an embodiment of the present disclosure, for any color channel of any first sampling point in the first image (e.g., filter template image), the mapping relationships between respective color channels of the corresponding second sampling point of the second image (e.g., de-filter template image) and the any color channel of the any first sampling point may be determined respectively, to obtain the mapping relationships between the any first sampling point and the corresponding second sampling point. Here, the color channel may be an RGB (red, green, blue) channel, or other possible color channels, for example, YCbCr, YUV channels, etc. The present disclosure does not limit the color channels.

In the following, taking RGB channels as an example, the method for determining the mapping relationships between the first sampling point and the second sampling point according to an embodiment of the present disclosure is described, but the method may also be applied to other possible color channels.

Referring back to FIG. 4, at step 402, a mapping equation set may be built based on multiple sampling point pairs of the filter template image and the de-filter template image.

For example, a first equation set, a second equation set, and a third equation set can be built. Specifically, the first equation set may include mapping equation of the pixel value of the red channel, the green channel, and the blue channel of the sampling point of the de-filter template image to the pixel value of the red channel of the corresponding sampling point of the filter template image, built for each sampling point, that is, the first equation set may include N (or N×r) such mapping equations. The second equation set may include mapping equation of the pixel value of the red channel, the green channel, and the blue channel of the sampling point of the de-filter template image to the pixel value of the green channel of the corresponding sampling point of the filter template image, built for each sampling point, that is, the second equation set may include N (or N×r) such mapping equations. The third equation set may include mapping equation of the pixel value of the red channel, the green channel, and the blue channel of the sampling point of the de-filter template image to the pixel value of the blue channel of the corresponding sampling point of the filter template image, built for each sampling point, that is, the third equation set can include N (or N×r) such mapping equations.

According to an embodiment of the present disclosure, in order to improve generalization ability of the model, multiple linear function may be used to build the model. In order to obtain a better image filter effect, after repeated experiments and verifications, the present disclosure preferably uses a quartic linear function to establish the mapping equations in the first equation set, the second equation set and the third equation set. It may be understood that the mapping equation is not limited to the quartic linear function, and other preferred solutions may also be used to establish the mapping equations.

For example, the mapping equations in the first equation set may be expressed as Equation 2.

$$Ri = kR1*ri^4 + KR2*ri^3 + KR3*ri^2 + kR4*ri + kR5*(gi+bi)/2 + kR6*(gi^2+bi^2)/2 + KR7*(gi^3+bi^3)/2 + kR8*(gi^4+bi^4)/2 + kR9 \quad \text{[Equation 2]}$$

wherein the mapping equations in the second equation set may be expressed as Equation 3.

$$Gi = kG1*gi^4 + kG2*gi^3 + kG3*gi^2 + kG4*gi + kG5*(ri+bi)/2 + kG6*(ri^2+bi^2)/2 + kG7*(ri^3+bi^3)/2 + kG8*(ri^4+bi^4)/2 + kG9 \quad \text{[Equation 3]}$$

wherein the mapping equations in the third equation set may be expressed as Equation 4.

$$Bi = kB1*bi^4 + kB2*bi^3 + kB3*bi^2 + kB4*bi + kB5*(gi+ri)/2 + kB6*(gi^2+ri^2)/2 + kB7*(gi^3+ri^3)/2 + kB8*(gi^4+ri^4)/2 + kB9 \quad \text{[Equation 4]}$$

wherein Ri, Gi, and Bi, respectively represent the pixel values of the red channel the pixel value of the green channel, and the pixel value of the blue channel of the i-th sampling point of the filter template image. ri, gi, and bi respectively represent the pixel value of the red channel, the pixel value of the green channel, and the pixel value of the blue channel of the i-th sampling point of the de-filter template image. KR1, kR2, kR3, kR4, kR5, kR6, kR7, kR8, and kR9 are image filter parameters to be solved for the first equation set. kG1, kG2, kG3, kG4, kG5, kG6, kG7, kG8, and kG9 are image filter parameters to be solved for the second equation set. kB1, kB2, kB3, kB4, kB5, kB6, kB7, kB8, and kB9 are image filter parameters to be solved for the third equation set.

Returning to FIG. 4, at step 403, the built mapping equations are solved to obtain the mapping relationship, wherein an estimated fitting curve is shown in FIG. 4. Specifically, the first equation set, the second equation set, and the third equation set may be solved to obtain the mapping relationship of transforming the de-filter template image to the filter template image.

According to an embodiment of the present disclosure, as long as the image filter parameters, for example, kR1, KR2, kR3, kR4, kR5, kR6, kR7, kR8, kR9, kG1, kG2, kG3, kG4, kG5, kG6, kG7, kG8, kG9, kB1, kB2, kB3, kB4, kB5, kB6, kB7, kB8, kB9 of the mapping equations in the first equation set, the second equation set and the third equation set are solved, and the image filter parameters are substituted into the mapping equations in the first equation set, the second equation set, and the third equation set, the mapping relationship of transforming the de-filter template image is converted to the filter template image may be obtained.

For example, in the above first equation set, second equation set, and third equation set, a number of unknowns of each set is 9, and a number of mapping equations is the number of sampling points N (or N×r), for example, since N is equal to or greater than 4000 (N is not limited to this) and N (or N×r) is much greater than 9, the first equation set, the second equation set, and the third equation set are all overdetermined equation sets. The equation of the overdetermined equation sets may be expressed as Equation 5:

$$x\beta = y \quad \text{[Equation 5]}$$

$$x = \begin{pmatrix} x_{11} & x_{12} & \cdots & x_{19} \\ \vdots & \vdots & & \vdots \\ x_{N1} & x_{N2} & \cdots & x_{N9} \end{pmatrix}$$

$$\beta = \begin{matrix} \beta_1 \\ \cdots \\ \beta_9 \end{matrix}$$

$$y = \begin{matrix} y_1 \\ \cdots \\ y_N \end{matrix}$$

Therefore, in Equation 2, $\beta_1$=KR1, $\beta_2$=KR2, $\beta_3$=KR3, $\beta_4$=KR4, $\beta_5$=kR5, $\beta_6$=KR6, $\beta_7$=KR7, $\beta_8$=KR8, $\beta_9$=KR8, and thus x and y are calculated as follows in Equation Set 1:

$x_{i1}=1$ [Equation Set 1-1]

$x_{i2}=r_i$ [Equation Set 1-2]

$x_{i3}=r_i*r_i$ [Equation Set 1-3]

$x_{i4}=r_i*r_i*r_i$ [Equation Set 1-4]

$x_{i5}=r_i*r_i*r_i*r_i$ [Equation Set 1-5]

$x_{i6}=(g_i+b_i)/2$ [Equation Set 1-6]

$x_{i7}=(g_i*g_i+b_i*b_i)/2$ [Equation Set 1-7]

$x_{i8}=(g_i*g_i*g_i+b_i*b_i*b_i)/2$ [Equation Set 1-8]

$x_{i9}=(g_i*g_i*g_i*g_i+b_i*b_i*b_i*b_i)/2$ [Equation Set 1-9]

$y_i=R_i$ [Equation Set 1-10]

In Equation 3, $\beta_1$=kG1, $\beta_2$=kG2, $\beta_3$=kG3, $\beta_4$=kG4, $\beta_5$=kG5, $\beta_6$=kG6, $\beta_7$-KG7, $\beta_8$=kG8, $\beta_9$=kG8, and thus x and y are calculated as follows in Equation Set 2:

$x_{i1}=1$ [Equation Set 2-1]

$x_{i2}=g_i$ [Equation Set 2-2]

$x_{i3}=g_i*g_i$ [Equation Set 2-3]

$x_{i4}=g_i*g_i*g_i$ [Equation Set 2-4]

$x_{i5}=g_i*g_i*g_i*g_i$ [Equation Set 2-5]

$x_{i6}=(r_i+b_i)/2$ [Equation Set 2-6]

$x_{i7}=(r_i*r_i+b_i*b_i)/2$ [Equation Set 2-7]

$x_{i8}=(r_i*r_i*r_i+b_i*b_i*b_i)/2$ [Equation Set 2-8]

$x_{i9}=(r_i*r_i*r_i*r_i+b_i*b_i*b_i*b_i)/2$ [Equation Set 2-9]

$y_i=G_i$ [Equation Set 2-10]

In Equation 4, $\beta_1$=kB1, $\beta_2$=kB2, $\beta_3$=kB3, $\beta_4$=KB4, $\beta_5$=kB5, $\beta_6$=kB6, $\beta_7$=kB7, $\beta_8$=kB8, $\beta_9$=kB8, and thus x and y are calculated as follows in Equation Set 3.

$x_{i1}=1$ [Equation Set 3-1]

$x_{i2}=b_i$ [Equation Set 3-2]

$x_{i3}=b_i*b_i$ [Equation Set 3-3]

$x_{i4}=b_i*b_i*b_i$ [Equation Set 3-4]

$x_{i5}=b_i*b_i*b_i*b_i$ [Equation Set 3-5]

$x_{i6}=(r_i+g_i)/2$ [Equation Set 3-6]

$x_{i7}=(r_i*r_i+g_i*g_i)/2$ [Equation Set 3-7]

$x_{i8}=(r_i*r_i*r_i+g_i*g_i*g_i)/2$ [Equation Set 3-8]

$x_{i9}=(r_i*r_i*r_i*r_i+g_i*g_i*g_i*g_i)/2$ [Equation Set 3-9]

$y_i=B_i$ [Equation Set 3-10]

According to an embodiment of the present disclosure, a numerical optimization algorithm (such as L-BFGS algorithm) may be used to solve the above equation sets (i.e., the first equation set, the second equation set, and the third equation set).

The L-BFGS algorithm refers to the limited-memory BFGS algorithm (Limited-memory BFGS), the basic idea thereof is to save only the most recent m times of iteration information, thereby greatly reducing the storage space of data. The steps of the algorithm L-BFGS are as follows ($f(x)=x\beta-y$ in this step):

Step 1: select original point $x_0$, operation error $\varepsilon>0$, store iteration data of the last m times;

Step 2:

$k=0, H_0=I, r=\nabla f(x_0)$

Step 3: if $\|\nabla f(x_{k+1})\| \leq \varepsilon$, return the optimal solution x, else go to Step 4;

Step 4: calculate the feasible direction of this iteration $p_k=-r_k$;

Step 5: calculate the step length $\alpha_k>0$, perform one-dimensional search on the following formula $f(x_k+\alpha_k p_K)=\min f(x_k+\alpha p_k)$ Step 6: update weight x $x_{k+1}=x_k+\alpha_k p_k$ Step 7: if k>m, maintain the vector pairs for the last m times, delete $(s_{k-m}, t_{k-m})$ Step 8: calculate and maintain $s_k=x_{k+1}-x_k$ $t_k=\nabla f(x_{k+1})-\nabla f(x_k)$ Step 9: solve $r_k=B_k \nabla f(x_k)$ using two-loop recursion algorithm Step 10: k=k+1, and go to Step 3

Part of the calculation formulas used in the steps of L-BFGS algorithm is as follows in Equation 6.

$$s_k = x_k - x_{k-1}$$
$$t_k = \nabla f(x_k) - \nabla f(x_{k-1})$$
$$\rho_k = \frac{1}{t_k^T s_k}$$
$$V_k = 1 - \rho_k t_k s_k^T$$

[Equation 6]

The two-loop-recursion algorithm used in the steps of L-BFGS algorithm is as follows:

1) IF $ITER = < M$  SET $INCR = 0$;  ELSE  SET $INCR = ITER - M$ $\quad\quad\quad\quad$ BOUND = ITER $\quad\quad\quad$ BOUND = M 2) $q_{BOUND} = g_{ITER}$ 3) FOR $i = $ (BOUND−1), ... , 0

$\quad j = i + incr$
$\quad \alpha_i = \rho_j s_j^T q_{i+1}$  (STORE $\alpha_i$) $\quad$ (a)
$\quad q_i = q_{i+1} - \alpha_i y_i$ $\quad$ (b)

$r_0 = H_0 \cdot q_0$ $\quad$ (c)

FOR $i = 0, 1, ... ,$ (BOUND−1)

$\quad j = i + incr$
$\quad \beta_j = \rho_j \gamma_j^T r_i$ $\quad$ (d)
$\quad r_{i+1} = r_i + s_j(\alpha_i - \beta_i)$ $\quad$ (e)

According to an embodiment of the present disclosure, the above-mentioned equation sets (i.e., the first equation set, the second equation set, and the third equation set) may be solved using least square method.

The least square method finds best function match of data by minimizing sum of squares of error. The least square method may be used to easily obtain unknown data, and minimize the sum of squares of error between the obtained data and the actual data.

Consider the overdetermined equation set:

$$\sum_{j=1}^{n} X_{ij}\beta_j = yi, (i = 1, 2, 3 \ldots m),$$ [Equation 7]

wherein, m means there are m equations, n means there are n unknowns β, m>n. According to an embodiment of the present disclosure, m=N, n=9.

Vectorizing the above formula as:

$$X\beta = y$$ [Equation 8]

$$X = \begin{bmatrix} X_{11} & X_{12} & \cdots & X_{1n} \\ X_{21} & X_{22} & \cdots & X_{2n} \\ \vdots & \vdots & & \vdots \\ X_{m1} & X_{m2} & \cdots & X_{mn} \end{bmatrix}, \beta = \begin{bmatrix} \beta_1 \\ \beta_2 \\ \vdots \\ \beta_n \end{bmatrix}, y = \begin{bmatrix} y_1 \\ y_2 \\ \vdots \\ y_m \end{bmatrix}$$

Obviously, this equation set generally has no solution, so in order to select the most appropriate β, making the equation "as true as possible", the residual sum of squares function S (in statistics, the residual sum of squares function may be regarded as n times of Mean Square Error (MSE)) is introduced.

$$S(\beta)=\|X\beta-y\|^2$$ [Equation 9]

When $\beta=\hat{\beta}$, $S(\beta)$ takes minimum value, recorded as:

$$\hat{\beta}=\operatorname{argmin}(S(\beta))$$ [Equation 10]

By differentiating S(β) to find the best value, getting:

$$x^T X\hat{\beta}=x^T y$$ [Equation 11]

If the matrix $x^T X$ is nonsingular, then there is a unique solution β:

$$\hat{\beta}=(x_T X)^{-1} x^T y$$ [Equation 12]

The unique solution is the solution of the unknown in the formula.

Compared with generating an image filter using global statistical information, the image filter proposed by the present disclosure contains rich and diverse color information, the filter effect is softer, more natural, contains more color features, and the effect is more beautiful.

Returning to FIG. 1, at step 104, after the image filter is obtained, an image to be processed (e.g., a third image) may be rendered using the obtained image filter to output the fourth image. According to an embodiment of the present disclosure, a direct calculation method may be used to obtain pixel values of the image to be processed directly rendered by the image filter.

Specifically, when the above equation sets (e.g., the first equation set, the second equation set, and the third equation set) are solved out, for example, 27 image filter parameters may be obtained, that is, kR1, kR2, kR3, kR4, kR5, kR6, kR7, kR8, kR9, kG1, kG2, kG3, kG4, kG5, kG6, kG7, kG8, kG9, kB1, kB2, kB3, kB4, kB5, kB6, kB7, kB8, kB9. These 27 image filter parameters may be stored in a memory or a server and the like. When it needs to use an image filter function, these 27 image filter parameters are read, and the pixel value of red channel, the pixel value of green channel, and the pixel value of blue channel of each pixel point of the image to be processed are used as the pixel value of red channel, the pixel value of green channel, and the pixel value of blue channel of each sampling point of the de-filter template image, and substituted into the mapping equations in the above equation sets (i.e., the first equation set, the second equation set, and the third equation set), to calculate the pixel value of each pixel point of the image to be processed directly rendered by the image filter.

Figure 7:
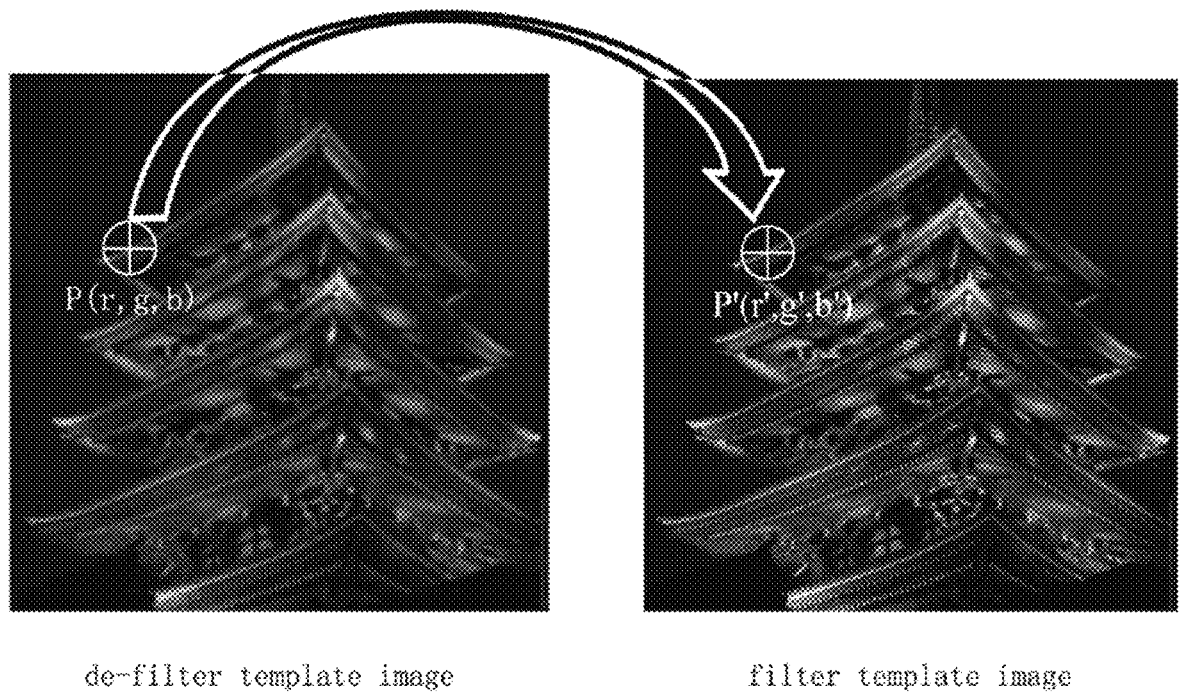
FIG. 7 is a schematic diagram illustrating a filter template image, a de-filter template, an image to be processed, and a rendered image according to an embodiment of the present disclosure.
Figure 7:
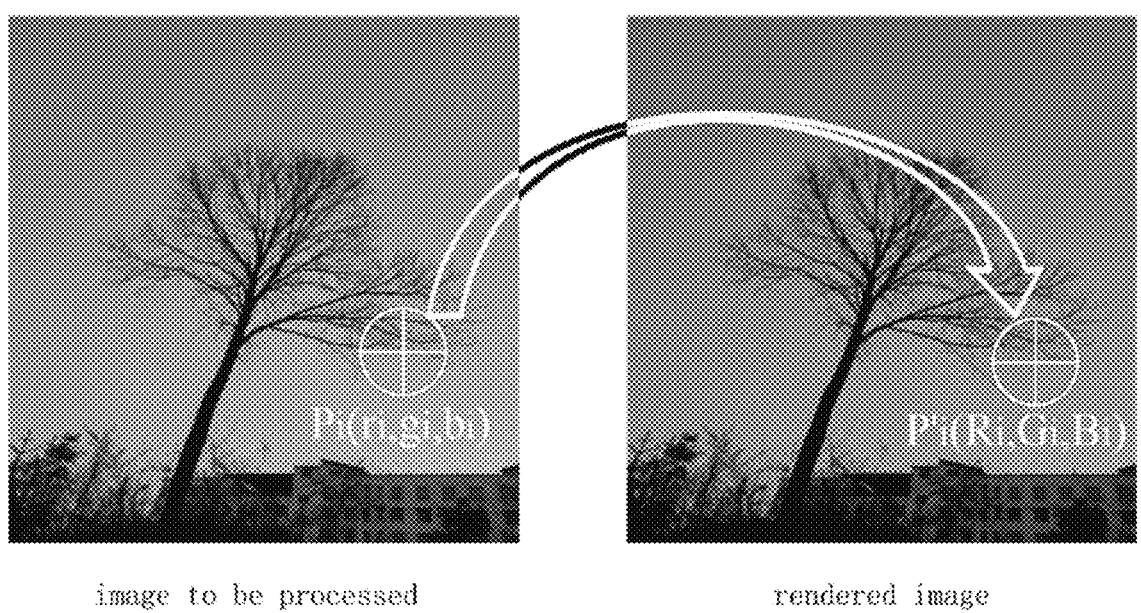

For example, FIG. 7 is a schematic diagram illustrating a filter template image (a first image), a de-filter template (a second image), an image to be processed (a third image), and a fourth image according to an embodiment of the present disclosure.

As shown in FIG. 7, for each sampling point pair in the first image and the second image, the above three mapping equations may be established. For example, in the second image, a pixel value of P sampling point is (136, 90, 85) in RGB format, normalized pixel value thereof is (r, g, b)= (0.53, 0.35, 0.33), in the first image, a pixel value of P' sampling point corresponding to the P sampling point is (100, 6, 9) in RGB format, normalized pixel value thereof is (r', g', b')=(0.39, 0.02, 0.04), therefore, the mapping equation between these two sampling points may be expressed as Equations 13-15.

0.39=kR1*0.08+kR2*0.15+KR3*0.28+KR4*0.53+
 kR5*0.68+kR6*0.11+KR7*0.04+kR8*0.01+kR9 [Equation 13]

0.02=kG1*0.02+kG2*0.04+kG3*0.12+kG4*0.35+
 kG5*0.86+kG6*0.39+kG7*0.19+kG8*0.09+kG9 [Equation 14]

0.04=kB1*0.01+kB2*0.04+kB3*0.11+kB4*0.33+
 kB5*0.88+kB6*0.40+kB7*0.19+kB8*0.10+kB9 [Equation 15]

For N sampling point pairs, N×3 mapping equations may be established. The L-BFGS algorithm or the least square method may be used to solve these mapping equations. For example, the above 27 image filter parameters may be solved as values shown in Table 1 below:

TABLE 1

| kR1 | kR2 | kR3 | kR4 | kR5 | kR6 | kR7 | kR8 | kR9 |
| --- | --- | --- | --- | --- | --- | --- | --- | --- |
| −0.03 | 0.62 | 0.86 | −0.46 | −0.08 | 0.46 | −2.33 | 4.90 | −3.21 |
| kG1 | kG2 | kG3 | kG4 | kG5 | kG6 | kG7 | kG8 | kG9 |
| −0.02 | −0.33 | 5.50 | −8.19 | 3.84 | 0.79 | −2.83 | 3.86 | −1.73 |
| kB1 | kB2 | kB3 | kB4 | kB5 | kB6 | kB7 | kB8 | kB9 |
| −0.02 | 0.12 | 3.30 | −5.80 | 3.31 | 0.26 | −0.37 | 0.52 | −0.30 |

After the 27 image filter parameters are obtained as shown in Table 1, the following three mapping equations may be obtained:

Ri=−0.03*ri^4+0.62*ri^3+0.86*ri^2−0.46*ri−0.08*
 (gi+bi)/2+0.46*(gi^2+bi^2)/2-2.33*(gi^3+bi^3)/
 2+4.90*(gi^4+bi^4)−3.21 [Equation 16]

Gi=−0.02*gi^4−0.33*gi^3+5.50*gi^2−8.19*gi+3.84*
 (ri+bi)/2+0.79*(ri^2+bi^2)/2−2.83*(ri^3+bi^3)/2+
 3.86*(ri^4+bi^4)−1.73 [Equation 17]

Bi=−0.02*bi^4+0.12*bi^3+3.30*bi^2−5.80*bi+3.31*
 (gi+ri)/2+0.26*(gi^2+ri^2)/2−0.37*(gi^3+ri^3)/2+
 0.52*(gi^4+ri^4)−0.30 [Equation 18]

wherein Ri, Gi and, Bi respectively represent the pixel value of red channel, the pixel value of green channel and the pixel value of blue channel of the i-th sampling point of the rendered image. ri, gi, and bi respectively represent the pixel value of red channel, the pixel value of green channel and the pixel value of blue channel of the i-th sampling point of the third image.

For example, when the pixel value of the Pi sampling point of the third image (e.g., a preview image) is (187, 193, 207) in the RGB format, normalized pixel value thereof is (ri, gi, bi)=(0.73, 0.76, 0.81), and which is substituted into the above three mapping equations, then the normalized pixel value (Ri, Gi, Bi)=(0.75, 0.67, 0.69) of the P'i sampling point corresponding to the Pi sampling point of the third image in the rendered image may be obtained, and the normalized pixel value is multiplied by 255, then the RGB pixel value, that is, (192, 172, 177), of the rendered image may be obtained.

According to an embodiment of the present disclosure, a color lookup table method (LUT) may be used to directly render the image to be processed.

Specifically, a 3D LUT (that is, a color look-up table method of three color channels (red channel, green channel, and blue channel)) may be used to obtain pixel values of the image to be processed after the image filter processing. The 3D LUT may first use the direct calculation method, calculate corresponding output red channel pixel value, green channel pixel value and blue channel pixel value for each input red channel pixel value, green channel pixel value and blue channel pixel value, using the mapping equations in the above equation sets (i.e., the first equation set, the second equation set, and the third equation set), and generate and store the color lookup table including the corresponding input and output red channel pixel values, green channel pixel values and blue channel pixel values. When it needs to use the image filter function, the color lookup table is called, and the red channel pixel value, green channel pixel value and blue channel pixel value of each pixel point of the image to be processed are used as the input red channel pixel value and green channel pixel value and blue channel pixel value respectively, to obtain output red channel pixel value, green channel pixel value, and blue channel pixel value, as pixel value of each pixel point of the image to be processed directly rendered by the image filter.

Figure 8:
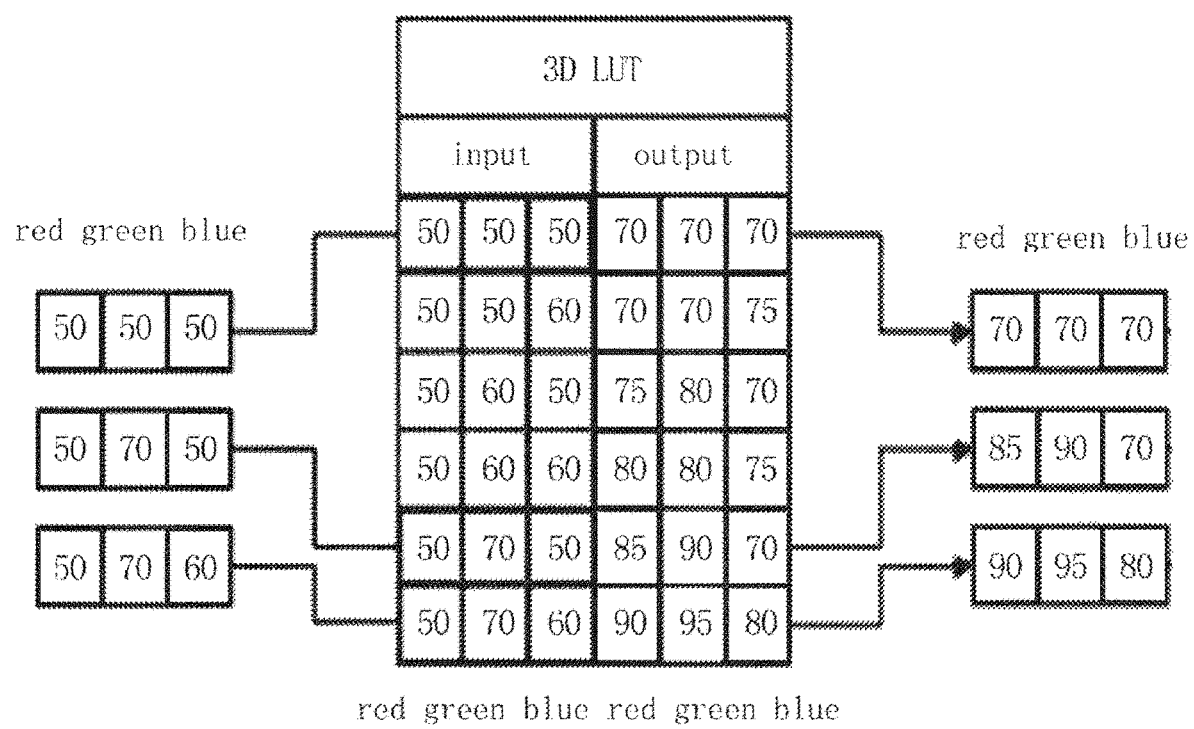
FIG. 8 is a schematic diagram illustrating a 3D LUT according to an embodiment of the present disclosure.

FIG. 8 is a schematic diagram illustrating the 3D LUT according to an embodiment of the present disclosure. Input and output relationship of the 3D LUT is as follows:

RGB output=LUT (R input, G input, B input),

3D LUT may map and process all color information, no matter there are colors or no colors, or color gamut that even film cannot reach.

According to an embodiment of the present disclosure, in the case that the filter template image is divided into a plurality of different parts, and a mapping relationship is generated for each part and/or an entire mapping relationship is generated for all parts, thereby generating multiple image filters, the following processes may be performed on the third image (image to be processed): segmenting the third image to obtain respective second segmented areas. For any second segmented area, obtaining an image filter corresponding to the second segmented area. Rendering the second segmented area using the image filter corresponding to the second segmented area, if there is no image filter corresponding to the second segmented area, rendering the second segmented area using the image filter corresponding to the first image, wherein, for the any second segmented area, an image filter corresponding to the first segmented area having a same segmentation category as the second segmented area in the first image may be determined as the image filter corresponding to the second segmented area.

For example, if the first image (filter template image) is segmented to generate 3 categories of segmented parts (category A/category B/category C), these 3 segmented parts may generate 3 different image filters, all the sampling points of the 3 segmented parts may generate an entire image filter. If the image to be processed is segmented to generate 4 categories of segmented parts (category A/category B/category C/category D), the category A segmented part may be directly rendered using the image filter generated for the category A segmented part of the filter template image, and the category B segmented part of the image to be processed may be directly rendered using the image filter generated for the category B segmented part of the filter template image, the category C segmented part of the image to be processed may be directly rendered using the image filter generated for the category C segmented part of the filter template image, and the category D segmented part of the image to be processed may be directly rendered using the entire image filter generated for all segmented parts of the filter template image.

Figure 9:
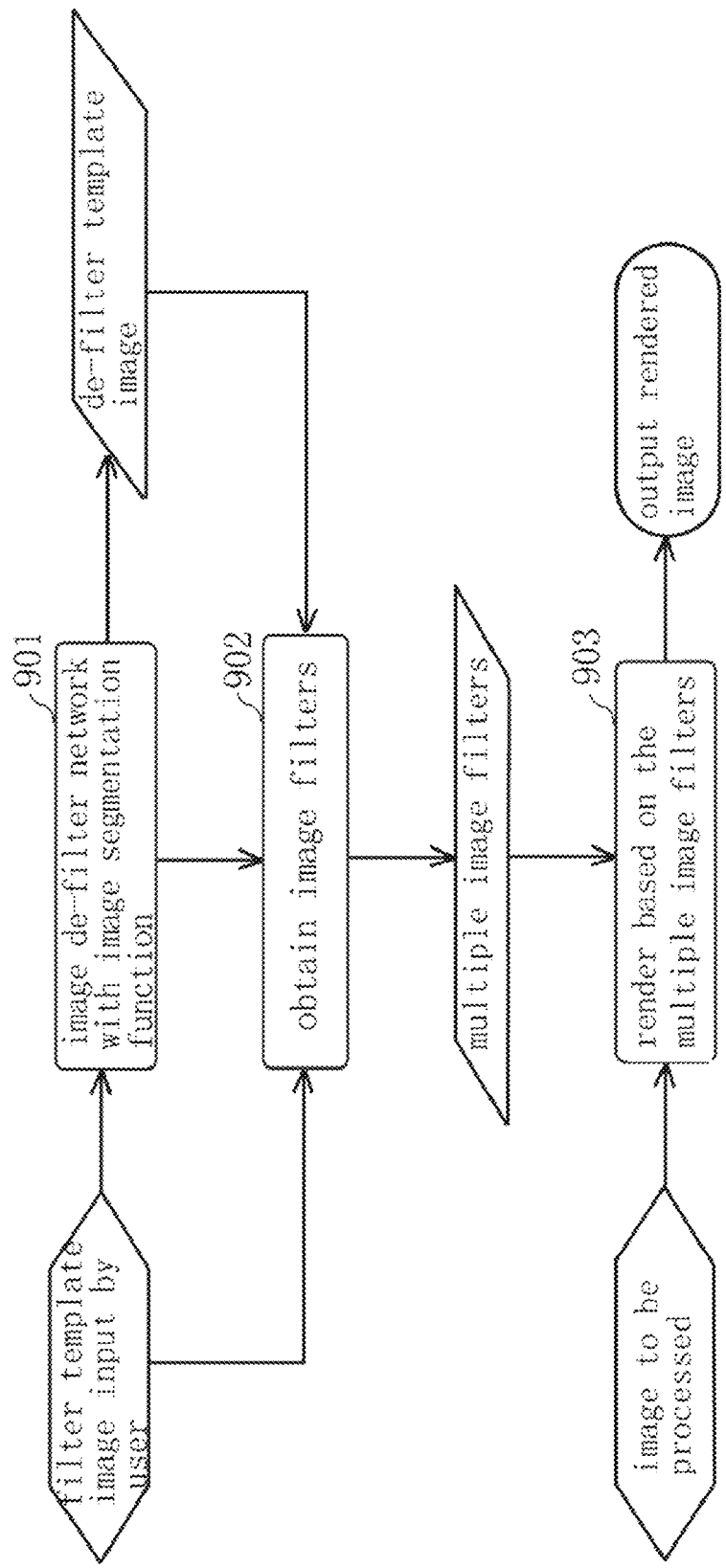
FIG. 9 is a flowchart of a method for rendering an image to be processed using multiple image filters according to an embodiment of the present disclosure.

For example, FIG. 9 is a flowchart of a method for rendering the image to be processed using multiple image filters according to an embodiment of the present disclosure.

As shown in FIG. 9, at step 901, based on a filter template image input by the user, a de-filter template image with a de-filter effect corresponding to the filter template image is obtained using an image de-filter network with image segmentation function, wherein, respective segmented areas in the filter template image and the de-filter template image have mapping relationships with different de-filter effects according to different categories.

At step 902, based on the filter template image and the de-filter template image, multiple image filters are obtained, wherein, the multiple image filters include multiple image filters generated for respective different mapping relationships of respective segmented areas of different categories, and/or an entire image filter generated for an entire mapping relationship of all parts.

At step 903, based on the multiple image filters, the image to be processed is rendered to output the rendered image, wherein, after the image to be processed is segmented, for a segmented area having a same category as any segmented area of the filter template image in the image to be processed, the image filter corresponding to the any segmented area of the filter template image is used as the image filter of the segmented area in the image to be processed for rendering, and for a segmented area having no same category as any segmented area of the filter template image in the image to be processed, the entire image filter is used as the image filter of the segmented area in the image to be processed for rendering.

Figure 10:
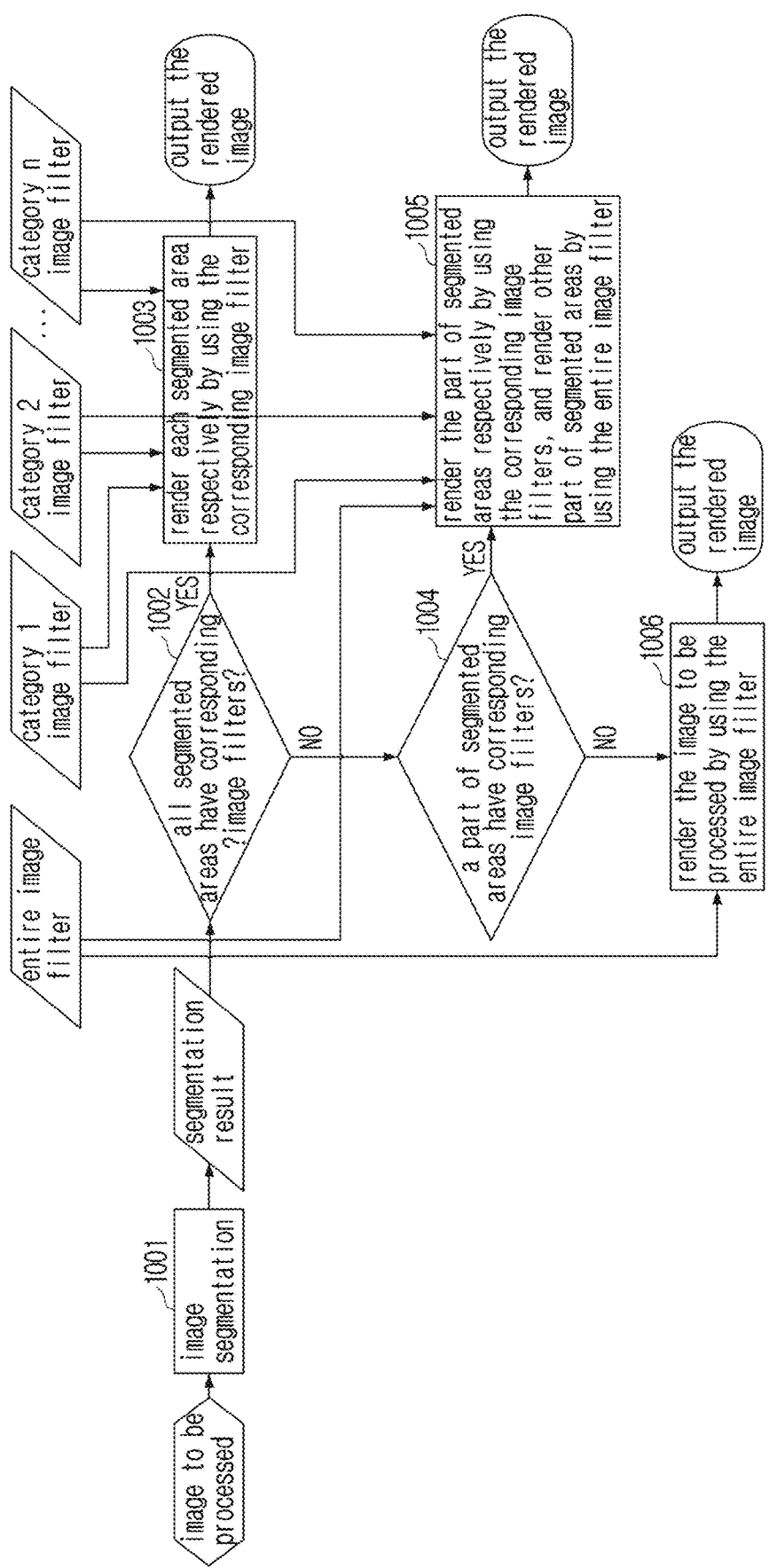
FIG. 10 is a flowchart illustrating a method of rendering the image to be processed to output a rendered image based on the multiple image filters according to an embodiment of the present disclosure.

For example, FIG. 10 is a flowchart illustrating a method of rendering the image to be processed to output the rendered image based on the multiple image filters according to an embodiment of the present disclosure.

As shown in FIG. 10, at step 1001, image segmentation is performed on the image to be processed to obtain segmented regions of different categories.

At step 1002, it is determined whether all the segmented areas of the image to be processed have corresponding image filters. Here, for each segmented area of the image to be processed, whether the segmented area of the image to be processed has corresponding image filter is determined by determining whether any of categories of all segmented areas of the filter template image is same as category of the segmented area of the image to be processed. For example, if any of the categories of all segmented areas of the filter template image is same as the category of the segmented area of the image to be processed, it is determined that the segmented area of the image to be processed has a corresponding image filter, if any of the categories of all segmented areas of the filter template image is not same as the category of the segmented area of the image to be processed, it is determined that the segmented area of the image to be processed has no corresponding image filter.

If yes, then at step 1003, each of all segmented areas of the image to be processed is rendered using an image filter corresponding to each segmented area respectively, to output the rendered image.

If no, then at step 1004, it is determined whether a part of the segmented areas of the image to be processed have corresponding image filters.

If yes, then step 1005, each of the part of the segmented areas of the image to be processed is rendered using an image filter corresponding to each segmented area respectively, and other segmented areas (the areas having no corresponding image filter) of the image to be processed are rendered using the entire image filter, to output the rendered image.

If no, then at step 1006, the image to be processed is rendered using the entire image filter, to output the rendered image.

According to an embodiment of the present disclosure, in order to improve the effect of the image filter, a rendering degree may be introduced when the image to be processed is rendered. That is, the image to be processed may be rendered using the image filter according to the rendering degree of the image to be processed. For example, the Alpha blending algorithm may be used to control the rendering effect. According to an embodiment of the present disclosure, the method of rendering may be: directly rendering the image to be processed (e.g., the third image) first using the image filter to obtain a directly rendered image (e.g., fourth image), then fusing the image to be processed (e.g., the third image) and the directly rendered image (e.g., the fourth image) based on the rendering degree of the image to be processed (e.g., the third image), to obtain the final rendered image (e.g., the fifth image). For example, the final rendered result (the fifth image)=the third image×(1−the rendering degree)+fourth image×the rendering degree. The rendering degree used in the method for performing rendering according to the rendering degree of the image to be processed according to the embodiment of the present disclosure may include, but is not limited to, the rendering degree determined based on human face areas in the image to be processed and the rendering degree determined according to the scene similarity between the filter template image and the image to be processed, which is introduced below.

According to an embodiment of the present disclosure, when the image to be processed (e.g., the third image) is rendered, the rendering is performed further in consideration of the scene similarity between the filter template image (e.g., the first image) and the image to be processed and/or whether there are human face areas in the image to be processed, so as to improve the rendering fidelity and avoid unnatural human face skin color. Specifically, the rendering degree of the third image may be determined based on the scene similarity between the first image (e.g., filter template image) and the third image (e.g., the image to be processed) and/or the human face areas in the third image (e.g., the image to be processed), and the third image (e.g., the image to be processed) is rendered using the calculated image filter, according to the determined rendering degree.

Each pixel in the third image has its own rendering degree. When there are no human faces in the third image, the rendering degree of each pixel is equal, which is determined by scene similarity. When there are human faces in the third image, the rendering degree of each pixel in the human face areas is calculated, and the rendering degree of other areas is determined by the scene similarity.

For example, the human face areas of the third image may be detected, and the rendering degree of the human face areas may be determined based on the detected human face areas. The scene similarity between the first image and the third image may be detected, and the rendering degree of other areas except for the human face areas in the third image is determined according to the detected scene similarity. In other words, for the human face areas in the image to be processed, the rendering degree of the human face areas in the image to be processed is calculated separately, and for the area outside the human face areas in the image to be processed, the rendering degree of the area outside the human face areas in the image to be processed is determined using the scene similarity between filter template image and the image to be processed.

Figure 11A:
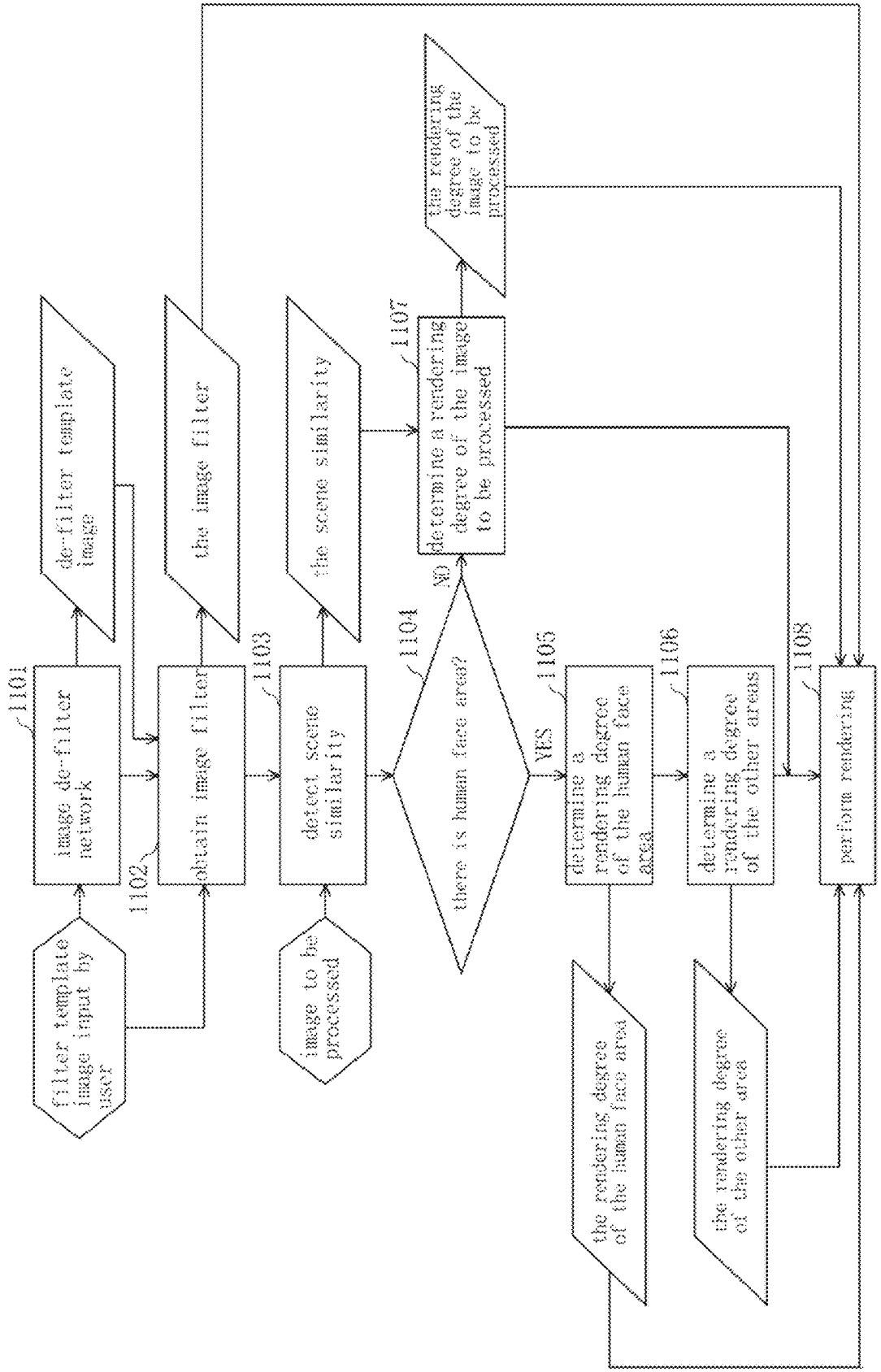
FIG. 11A is a flow chart illustrating a method of performing image processing in consideration of a scene similarity between a filter template image and an image to be pro-cessed and/or whether there are human face areas in the image to be processed according to an embodiment of the present disclosure.

For example, FIG. 11A is a flow chart illustrating a method of performing image processing in consideration of the scene similarity between the filter template image and the image to be processed and/or whether there are human face areas in the image to be processed according to an embodiment of the present disclosure.

As shown in FIG. 11A, at step 1101, based on the filter template image input by the user, the de-filter template image with the de-filter effect corresponding to the filter template image is obtained using the image de-filter network.

At step 1102, an image filter is obtained based on the filter template image and the de-filter template image.

At step 1103, the scene similarity between the filter template image and the image to be processed is detected.

At step 1104, whether there are human faces in the image to be processed is detected.

When there are human faces in the image to be processed, at step 1105, rendering degrees of the human face areas in the image to be processed is separately determined, and at step 1106, a rendering degree of other areas except for the human face areas in the image to be processed is determined according to the scene similarity.

When there are no human faces in the image to be processed, at step 1107, the rendering degree of the image to be processed is determined according to the scene similarity.

At step 1108, according to the determined rendering degree, the image to be processed is rendered based on the obtained image filter to output the rendered image.

Those skilled in the art can know that the order of some of the above steps is not limited, and can be performed forward, backward or simultaneously. For example, the order of step 1102 to step 1104 is not limited, and for another example, step 1103 to step 1107 may also be performed before step 1101.

Figure 11B:
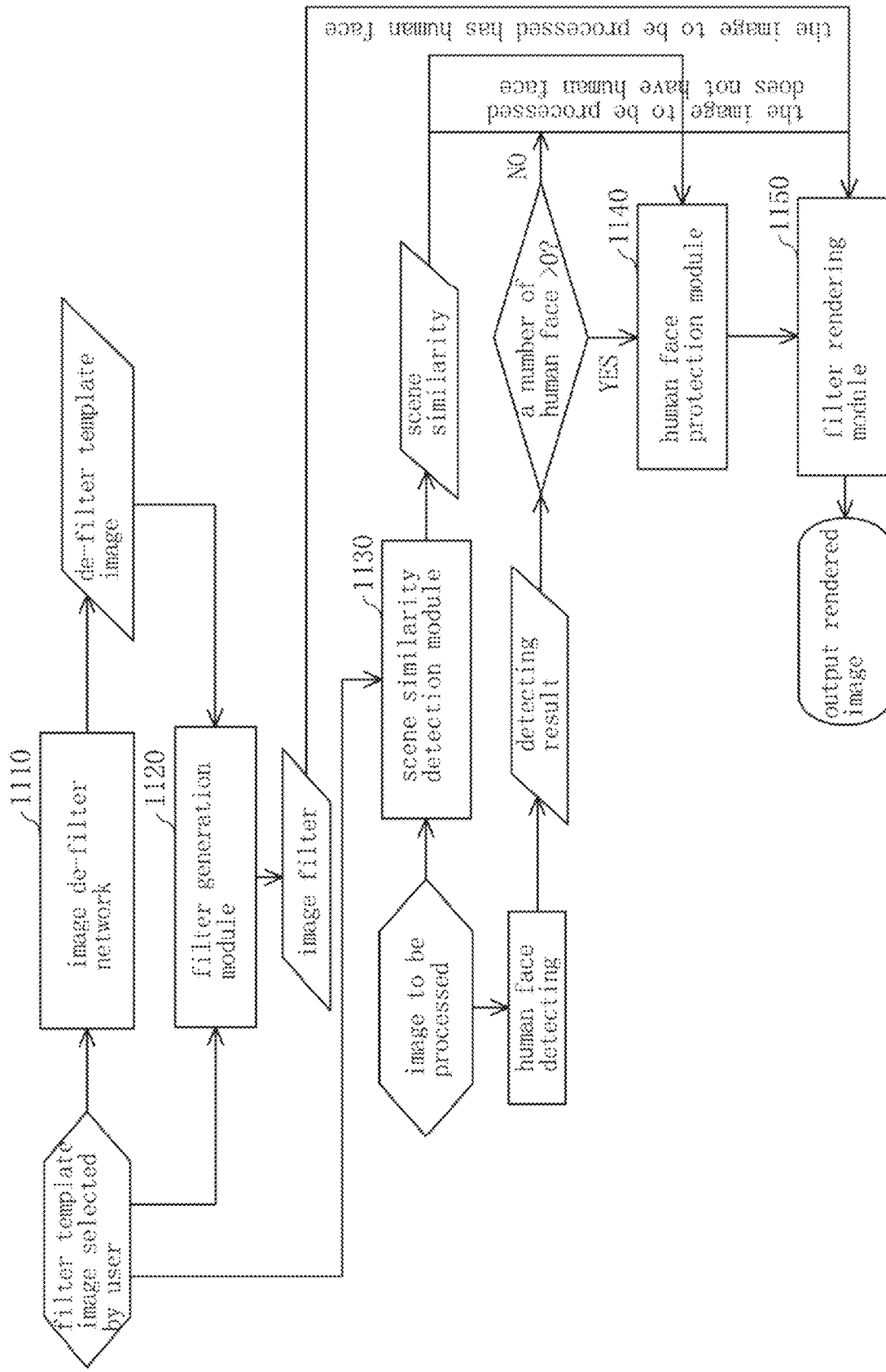
FIG. 11B is a schematic diagram illustrating a method of performing image processing in consideration of a scene similarity between a filter template image and an image to be processed and/or whether there are human face areas in the image to be processed according to an embodiment of the present disclosure.

For example, FIG. 11B is schematic diagram illustrating a method of performing image processing in consideration of the scene similarity between the filter template image and the image to be processed and/or whether there are human faces in the image to be processed according to an embodiment of the present disclosure.

As shown in FIG. 11B, the main bodies performing the method may include an image de-filter network 1110, a filter generation module 1120, a scene similarity detection module 1130, a human face protection module 1140, and a filter rendering module 1150.

The image de-filter network 1110 may be used to obtain a de-filter template image with a de-filter effect corresponding to the filter template image based on the filter template image input by the user. The image de-filter network 1110 may be an image de-filter network without an image segmentation function or an image de-filter network with an image segmentation function.

The filter generation module 1120 may be used to obtain an image filter based on the filter template image and the de-filter template image. When the image de-filter network 1110 is the image de-filter network without the image segmentation function, the filter generation module 1120 may obtain a single image filter. When the image de-filter network 1110 is the image de-filter network with the image segmentation function, the filter generation module 1120 may obtain multiple image filters.

The scene similarity detection module 1130 may be used to detect the scene similarity between the filter template image and the image to be processed.

The human face protection module 1140 may be used to determine the rendering degree of the human face areas in the image to be processed. For example, human face detection can be performed on the image to be processed. The main body performing human face detection may be included in the human face protection module 1140 or may be a separate main body from the human face protection module 1140. When one or many human faces included in the image to be processed according to the result of the human face detection, the human face protection module 1140 may determine the rendering degree of the human face areas in the image to be processed. When no human face is included in the image to be processed according to the result of the human face detection, the human face protection module 1140 does not perform the operation.

The filter rendering module 1150 may be used to render the image to be processed based on the obtained image filter according to the determined rendering degree, to output the rendered image. Specifically, when the image to be processed includes human faces, the filter rendering module 1150 may render the human face areas in the image to be processed according to the determined rendering degree of the human face areas, and render other areas in the image to be processed according to the rendering degree determined by the scene similarity. When the image to be processed includes no human face, the filter rendering module 1150 may render the image to be processed according to the rendering degree determined by the scene similarity. In the following, a method for determining the rendering degree of the human face areas according to the detected human face areas according to an embodiment of the present disclosure is specifically introduced.

According to an embodiment of the present disclosure, first, the detected human face areas may be divided into several blocks. Here, the detected human face areas may be detected actual human face areas, or may be human face areas after the detected actual human faces area are extended. For example, the human face areas may be extended by 20% in the image (extending the human face areas may effectively prevent the detected human face areas from being too small, and may protect the color rendering of the human face areas better). Subsequently, a human face color protection level of each block is calculated according to Gaussian distribution. For example, 2D Gaussian function may be used to build a human face color protection level table for each block. Subsequently, a rendering degree of each block is obtained according to the human face color protection level of each block. For example, the rendering degree of each block may be calculated as (1-human face color protection level). Calculating the human face color protection level through Gaussian distribution may make the filtering effect of the human face areas smoother and the color of the human face areas more natural.

Figure 12:
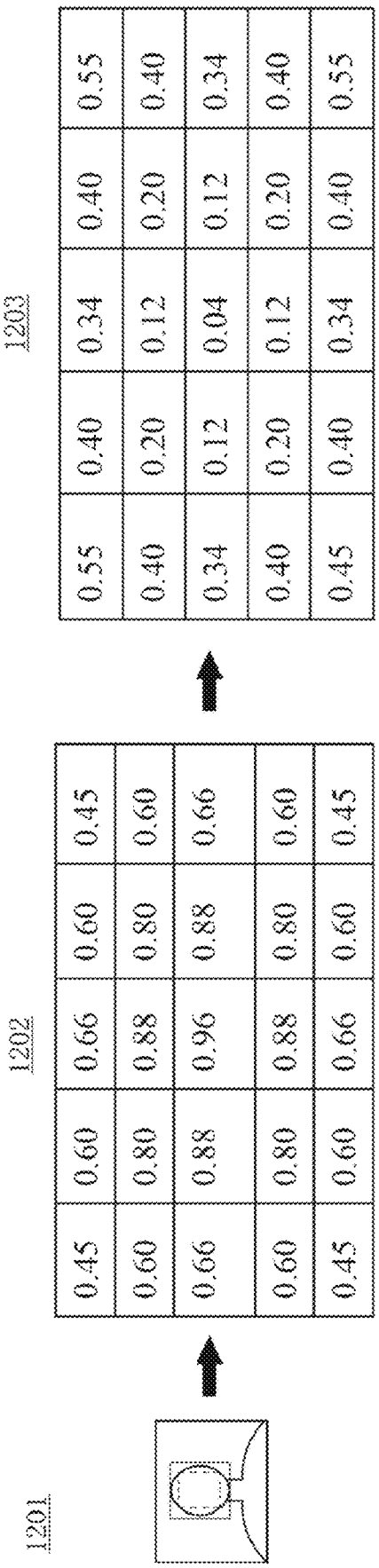
FIG. 12 illustrates a schematic diagram of calculating a rendering degree of a human face region according to an embodiment of the present disclosure.

For example, as shown in FIG. 12, FIG. 12 illustrates a schematic diagram of calculating the rendering degree of a human face area according to an embodiment of the present disclosure. The detected human face area (dotted box) may be extended in the image to be processed 1201 to obtain the extended human face area (solid box). Subsequently, the extended human face area may be divided into several blocks, for example, divided into k×k (e.g., 5×5) blocks. Subsequently, the human face color protection level of each area (e.g., a human face color protection level table 1202 of each area is established using 2D Gaussian function) is calculated according to Gaussian distribution. Subsequently, the rendering degree of each area 1203 may be obtained according to the human face color protection level of each block.

Hereinafter, a method for detecting the scene similarity between the first image and the third image according to an embodiment of the present disclosure is specifically introduced.

Figure 13:
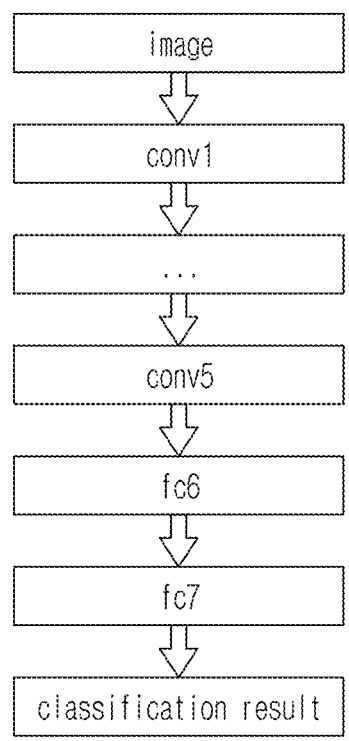
FIG. 13 is a schematic diagram illustrating a structure of a scene classification network according to an embodiment of the present disclosure.

According to an embodiment of the present disclosure, the first image (e.g., filter template image) and the third image (e.g., image to be processed) may be scene classified using a scene classification network. The scene similarity of the first image and the third image is determined based on scene classification result and features extracted by a set feature extraction layer in the scene classification network. FIG. 13 is a schematic diagram illustrating a structure of the scene classification network according to an embodiment of the present disclosure. As shown in FIG. 13, the scene classification network may include 5 convolutional layers (e.g., conv1, conv2, conv3, conv4, conv5) and 2 fully connection layers (e.g., fc6 and fc7), a total of 7 layers. The input of the scene classification network is the image, and the output is the classification result. middle features may also be output in respective middle layers of the scene classification network.

Specifically, if the two categories are consistent according to the scene classification result, it is determined that the scene similarity of the first image and the third image is a maximum value (e.g., the similarity is 1), therefore, the rendering degree of the image to be processed may also be the maximum value (e.g., the rendering degree is 1). If the two categories are inconsistent according to the scene classification result, the scene similarity of the filter template image and the image to be processed is calculated using the features extracted by the set feature extraction layer in the scene classification network (which may be the middle output value of the scene classification network), and the calculated scene similarity is used as the rendering degree of the image to be processed, wherein the scene similarity may also be referred to as scene consistency.

For example, whether the two categories are consistent may be determined using the output of the scene classification network (i.e., the classification result). For example, if the classification result of the filter template image by the scene classification network is class c1, and the classification result of the image to be processed by the scene classification network is class c2, it is determined that the scene categories of the filter template image and the image to be processed are inconsistent, and if the classification results of the filter template image and the image to be processed by the scene classification network are both class c3, it is determined that the scene categories of the filter template image and the image to be processed are consistent.

Alternatively or additionally, the features extracted at the set feature extraction layer during the classification process of the scene classification network (e.g., the features extracted through the conv5 layer of the scene classification network) may be used to calculate the scene similarity of the filter template image and the image to be processed. For example, the Markov distance dis of the normalized conv5 layer feature of the filter template image and the image to be processed may be calculated, and the scene similarity of the filter template image and the image to be processed is calculated as (1-dis), wherein values of the scene similarity may range from 0 to 1. The higher the value of the scene similarity, the higher the degree of scene similarity.

That is, when the scene categories of the filter template image and the image to be processed are consistent, the scene similarity may be considered as the maximum value (e.g., 1), which is used as the rendering degree. When the scene categories of the filter template image and the image to be processed are inconsistent, the scene similarity is calculated using the features extracted in the set feature extraction layer during the classification process of the scene classification network, which is used as the rendering degree.

Figure 14:
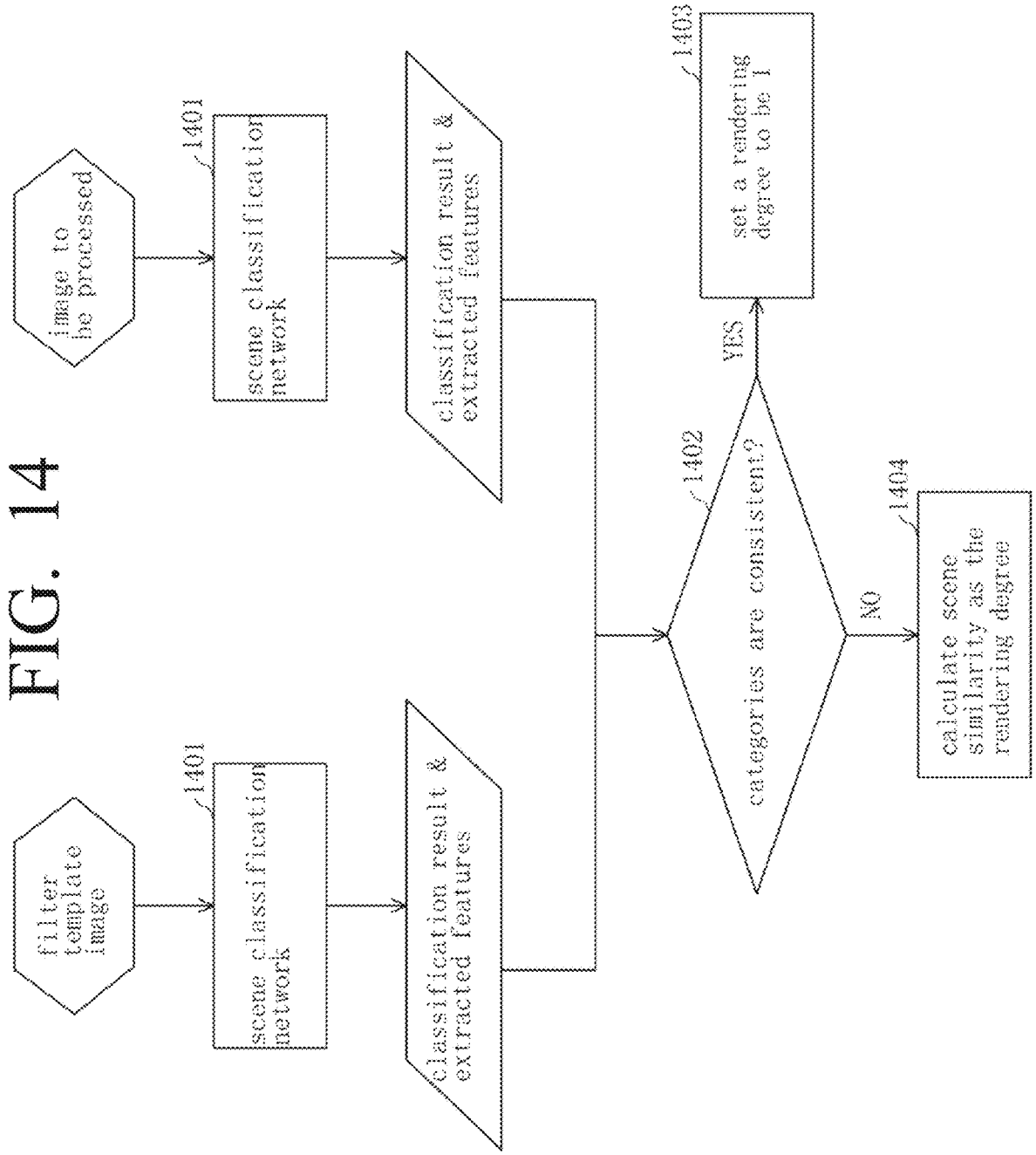
FIG. 14 is a flowchart illustrating a method for detecting a scene similarity between a filter template image and an image to be processed and determining a rendering degree according to the detected scene similarity, according to an embodiment of the present disclosure.

FIG. 14 is a flowchart illustrating a method for detecting the scene similarity between the filter template image and the image to be processed and determining the rendering degree according to the detected scene similarity, according to an embodiment of the present disclosure.

As shown in FIG. 14, at step 1401, the filter template image and the image to be processed is classified using a scene classification network. In the classification process, the features of the filter template image and the image to be processed extracted at the set feature extraction layer (e.g., conv5 layer) may be output. At the end of the classification, the classification results of the filter template image and the image to be processed may be output.

At step 1402, the classification results of the filter template image and the image to be processed are compared to determine whether the categories of the filter template image and the image to be processed are consistent.

At step 1403, if they are consistent, the rendering degree is set to 1.

At step 1404, if they are inconsistent, the scene similarity of the filter template image and the image to be processed is calculated using the features of the filter template image and the image to be processed extracted in the set feature extraction layer during the classification process, as the rendering degree.

Figure 15:
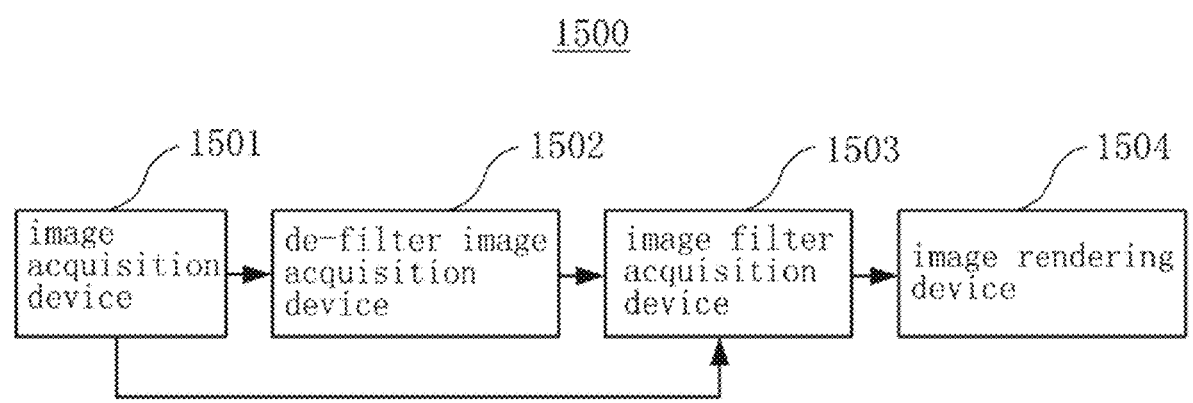
FIG. 15 is a block diagram illustrating an electronic apparatus of image processing according to an embodiment of the present disclosure.

FIG. 15 is a block diagram illustrating an electronic apparatus according to an embodiment of the present disclosure.

Referring to FIG. 15, an electronic apparatus 1500 according to an embodiment of the present disclosure includes an image acquisition device 1501, a de-filter image acquisition device 1502, an image filter acquisition device 1503, and an image rendering device 1504.

The image acquisition device 1501 may acquire a first image input by a user, wherein the first image may be any image input by the user. Here, the first image refers to an image of which the user wishes to obtain a filter effect. Therefore, hereinafter, the first image may be referred to as a filter template image.

According to an embodiment of the present disclosure, the filter template image may be any image, selected by the user, if which a style or an effect is desired to be obtained. Specifically, the filter template image is not necessarily an image with filter effect, but also an image without filter effect. As long as the user wishes to obtain a style or an effect of an image, the user may select the image as the filter template image.

According to an embodiment of the present disclosure, the filter template image may be acquired from a local storage or a local database or received from an external data source (e.g., the Internet, a server, a database, etc.) through an input device or a transmission medium, as needed.

The de-filter image acquisition device 1502 may obtain a second image with a de-filter effect corresponding to the first image based on the first image, using an image de-filter network.

Hereinafter, the second image may also be referred to as a de-filter template image.

According to an embodiment of the present disclosure, the image de-filter network may be a deep convolutional neural network. The deep convolutional neural network proposed by various embodiments of the present disclosure has more than 3 layers, including an input layer, convolution layers, normalization layers, a convolution layer and a normalization layer with skip connection structure, up-sampling layers and an output layer.

Specifically, the input layer of the deep convolutional neural network proposed by the present disclosure is used to input the filter template image. The convolutional layer of the deep convolutional neural network proposed by the present disclosure is used for feature extraction of the input data. In order to improve the effect of the proposed deep convolutional neural network, the present disclosure uses instance normalization. The instance normalization normalizes features on the image pixels, and the effect is obvious in stylization migration. The up-sampling interpolation method used by up-sampling layer of the deep neural network proposed in the present disclosure is the nearest neighbor method, which is the simplest interpolation method and does not need calculating, and in the four neighboring pixels of the desired pixel, the gray scale of the neighbor pixel closest to the desired pixel is assigned to the desired pixel. The output layer of the deep neural network proposed by the present disclosure is used to output a feature map with the same size as the input image. The deep neural network proposed by the present disclosure also adds a convolutional layer and a normalization layer with skip connection structure, to improve the performance of the deep convolutional neural network.

According to an embodiment of the present disclosure, the image de-filter network may be a U-NET type of deep convolutional neural network. It may be understood that the image de-filter network is not limited to this, and may also be other artificial neural networks. U-NET is a fully convolutional network that includes multi-layer down-sampling, multi-layer up-sampling, and skip connection structure, and its characteristic is that the convolutional layer is completely symmetric in the down-sampling and up-sampling parts, and the feature map at the down-sampling end may skip the deep sampling and be concatenated to the corresponding up-sampling end. The sizes of the input layer and output layer of the network are completely the same. The U-NET type of convolutional neural network is a Fully Convolutional Networks (FCNs) organized under the encoder-decoder paradigm. The U-NET deep convolutional neural network proposed by the present disclosure is also called as Encoder-Decoder Network.

According to an embodiment of the present disclosure, the U-NET deep convolutional neural network proposed by the present disclosure may be designed to include an input layer, convolutional layers and normalization layers, down-sampling layers, and a convolutional layer and a normalization layer with skip connection structure, up-sampling layers and a output layer. According to an embodiment of the present disclosure, the image de-filter network proposed by the present disclosure, which is a U-NET type of deep convolutional neural network, may be designed as an image de-filter network as shown in FIG. 2 or FIG. 3.

According to an embodiment of the present disclosure, the system 1500 may further include a training device (not shown). The training device may use a training image set including a plurality of images with filter effects (filter images) and a plurality of corresponding images in which filter effects are removed (de-filter images) (i.e., multiple image pairs, each image pair includes filter image and de-filter image corresponding to the filter image) to train the image de-filter network proposed by the present disclosure. The de-filter image acquisition device 1502 may use the trained image de-filter network to generate the de-filter template image corresponding to the filter template image. Alternatively or additionally, in order to train the network considering image segmentation result, the training device may appropriately modify the training image set. For example, the de-filter images in the training image set are obtained using different appropriate de-filter process on the corresponding filter images according to different image segmentation categories.

After the second image (de-filter template image) is obtained, the image filter acquisition device 1503 may obtain an image filter based on the first image and the second image. For example, the image filter acquisition device 1503 may calculate a mapping relationship of transforming the second image (de-filter template image) to the first image (filter template image), and use the calculated mapping relationship as an image filter.

According to an embodiment of the present disclosure, the image filter acquisition device 1503 may calculate the mapping relationship of transforming the de-filter template image to the filter template image based on image attributes of the filter template image and the de-filter template image. For example, the image filter acquisition device 1503 may calculate the mapping relationship of transforming the de-filter template image to the filter template image based on color attributes of the filter template image and the de-filter template image. According to an embodiment of the present disclosure, first, the image filter acquiring device 1503 may acquire multiple first sampling points in the filter template image and multiple second sampling points in the de-filter template image corresponding to the respective first sampling points in the filter template image may be acquired.

For example, the image filter acquiring device 1503 may perform uniform random sampling on the filter template image and the de-filter template image to obtain multiple sampling points in the filter template image and multiple sampling points in the de-filter template image corresponding to the multiple sampling points in the filter template image. Specifically, the image filter acquiring device 1503 may obtain corresponding sampling points of the filter template image and the de-filter template image by performing sampling on the filter template image and the de-filter template image. The sampling points of the filter template image and the sampling points of the de-filter template image correspond one-to-one in position. For example, the filter template image and the de-filter template image may be uniform random sampled using a uniform random sampling method. N sampling points may be collected in the filter template image and N sampling points of corresponding positions may be collected in the de-filter template image, wherein N may be equal to or greater than 4000. It may be understood that the number of N is not limited to this.

For another example, because a salient target in the image is very important and may attract more of the user's attention, the extraction of more sampling points for the salient target in the image may make the image filter more in line with the human visual psychology and more focus on the effect of the salient target, thereby improving the performance of image filters. In other words, a density of the first sampling points in the area where the salient target is located (a number of first sampling points per unit area) may be greater than the density of the first sampling points in the area outside the salient target. Therefore, larger sampling weight may be applied to salient target regions in the image, and smaller sampling weight may be applied to other regions. For example, it is assumed that N pairs of sampling points are collected in the filter template image and the de-filter template image. Salient target in the filter template image is extracted, for example, salient target may be detected and extracted using a salience detection network. N×T points (T>0.5) are sampled in the area where the salient target of the filter template image is located and the corresponding position of the de-filter template image, wherein T may be an extraction ratio (i.e., the sampling weight), and N×(1−T) points are sampled in the area outside of the salient target of the filter template image and the corresponding position of the de-filter template image, therefore, the sampling weight for the area where the salient object is located in the image is greater than the sampling weight for the area outside of the salient target, that is, the more sampling points are extracted in the area where the salient target is located in the image, wherein N may be equal to or greater than 4000. It may be understood that the number of N is not limited to this. T may be set according to factors of user requirement, image features and the like. For example, a ratio t of the area where the salient target is located in the image may be calculated, and T may be set to 0.5+0.5t. Alternatively or additionally, the uniform random sampling method may be applied to the sampling of both the area where the salient target is located and the area outside of the salient target in the image.

For another example, different parts in the image (e.g., different parts obtained by segmenting the image) may be considered to be sampled differently, and a mapping relationship may be generated for each part and/or an entire mapping relationship may be generated for all parts, thereby generating multiple image filters, so that different appropriate image filters are used for different parts of the image to enhance the performance of the image filters. For example, it is assumed that N pairs of sampling points are collected in the filter template image and the de-filter template image. The filter template image is segmented into multiple different parts, for example, the filter template image is segmented into multiple different parts through semantic segmentation. N×r points are sampled in each segmented part of the filter template image and the corresponding position of the de-filter template image (r is a ratio of the area of the segmented part to the total image area, r>=0.1), wherein N may be equal to or greater than 4000. It may be understood that the number of N is not limited to this. Alternatively or additionally, the uniform random sampling method may be applied to the sampling for each segmented part in the image.

Subsequently, the image filter acquiring device 1503 may calculate the mapping relationship of transforming the de-filter template image to the filter template image by calculating the color mapping relationship between all the multiple sampling points in the filter template image and all the corresponding multiple sampling points in the de-filter template image, and obtain the image filter according to the mapping relationship.

According to an embodiment of the present disclosure, the image filter acquiring device 1503 may segment the first image (e.g., filter template image) to obtain respective first segmented areas. For at least one first segmented area, obtain an image filter corresponding to the at least one first segmented area. Obtain an image filter corresponding to the first image based on the first image and the second image (e.g., de-filter template image). Wherein, for the at least one first segmented area, the image filter acquiring device 1503 may acquire a plurality of first sampling points in the first segmented area and a plurality of second sampling points corresponding to the plurality of first sampling points respectively in the second image, and acquire the image filter corresponding to the first segmented area by determining the mapping relationship between the respective first sampling points in the first segmented area and the corresponding second sampling points in the second image. In other words, for the case of segmenting the filter template image and the de-filter template image into multiple different parts and sampling according to each segmented part, the mapping relationship of transforming the de-filter template image to the filter template image of each segmented part may be calculated by the color mapping relationship between the multiple sampling points of the filter template image and the corresponding multiple sampling points in the de-filter template image of each segmented part, thereby obtaining multiple mapping relationships, and/or an entire mapping relationship of transforming the de-filter template image to the filter template image for all segmented parts may be calculated by the color mapping relationship between all the sampling points of the filter template image and all the sampling points in the de-filter template image of all the segmented parts.

In the following, a method for determining the mapping relationship between the first sampling points and the second sampling points according to an embodiment of the present disclosure is introduced.

According to an embodiment of the present disclosure, for any color channel of any first sampling point in the first image (e.g., filter template image), the mapping relationships between respective color channels of the corresponding second sampling point of the second image (e.g., de-filter template image) and the any color channel of the any first sampling point may be determined respectively, to obtain the mapping relationships between the any first sampling point and the corresponding second sampling point. Here, the color channel may be an RGB (red, green, blue) channel, or other possible color channels, for example, YCbCr, YUV channels, etc. The present disclosure does not limit the color channels.

In the following, taking RGB channels as an example, the method for determining the mapping relationships between the first sampling point and the second sampling point according to an embodiment of the present disclosure is described, but the method may also be applied to other possible color channels. For example, the image filter acquiring device 1503 may build a first equation set, a second equation set, and a third equation set. Specifically, the first equation set may include mapping equations of the pixel value of the red channel, the green channel, and the blue channel of the sampling point of the de-filter template image to the pixel values of the red channel of the corresponding sampling point of the filter template image, built for each sampling point, that is, the first equation set may include N (or N×r) such mapping equations. The second equation set may include mapping equations of the pixel value of the red channel, the green channel, and the blue channel of the sampling point of the de-filter template image to the pixel values of the green channel of the corresponding sampling point of the filter template image, built for each sampling point, that is, the second equation set may include N (or N×r) such mapping equations. The third equation set may include mapping equations of the pixel value of the red channel, the green channel, and the blue channel of the sampling point of the de-filter template image to the pixel values of the blue channel of the corresponding sampling points of the filter template image, built for each sampling point, that is, the third equation set can include N (or N×r) such mapping equations.

According to an embodiment of the present disclosure, in order to improve generalization ability of the model, multiple linear functions may be used to build the model. In order to obtain a better image filter effect, after repeated experiments and verifications, the present disclosure preferably uses a quartic linear function to establish the mapping equations in the first equation set, the second equation set and the third equation set. It may be understood that the mapping equation is not limited to the quartic linear function, and other preferred solutions may also be used to establish the mapping equations.

For example, the mapping equations in the first equation set may be expressed as:

$$Ri = kR1*ri^4 + kR2*ri^3 + kR3*ri^2 + kR4*ri + kR5*(gi+bi)/2 + kR6*(gi^2+bi^2)/2 + kR7*(gi^3+bi^3)/2 + kR8*(gi^4+bi^4)/2 + kR9 \quad \text{[Equation 19]}$$

wherein, the mapping equations in the second equation set may be expressed as:

$$Gi = kG1*gi^4 + kG2*gi^3 + kG3*gi^2 + kG4*g_i + kG5*(r_i+bi)/2 + kG6*(ri^2+bi^2)/2 + kG7*(ri^3+bi^3)/2 + kG8*(ri^4+bi^4)/2 + kG9 \quad \text{[Equation 20]}$$

wherein, the mapping equations in the third equation set may be expressed as:

$$Bi = kB1*bi^4 + kB2*bi^3 + kB3*bi^2 + kB4*bi + kB5*(gi+ri)/2 + kB6*(gi^2+ri^2)/2 + kB7*(gi^3+ri^3)/2 + kB8*(gi^4+ri^4)/2 + kB9 \quad \text{[Equation 21]}$$

wherein, Ri, Gi and Bi respectively represent the pixel values of the red channel the pixel value of the green channel, and the pixel value of the blue channel of the i-th sampling point of the filter template image, ri, gi and bi respectively represent the pixel value of the red channel, the pixel value of the green channel, and the pixel value of the blue channel of the i-th sampling point of the de-filter template image, kR1, KR2, KR3, kR4, kR5, kR6, kR7, kR8, and kR9 is the image filter parameter to be solved for the first equation set, kG1, kG2, kG3, kG4, kG5, kG6, kG7, kG8, and kG9 are the image filter parameters to be solved for the second equation set, kB1, kB2, kB3, kB4, kB5, kB6, kB7, kB8, and kB9 are image filter parameters to be solved for the third equation set.

Subsequently, the image filter acquiring device 1503 may solve the first equation set, the second equation set, and the third equation set to obtain the mapping relationship of transforming the de-filter template image to the filter template image, as image filter.

According to an embodiment of the present disclosure, as long as the image filter parameters, for example, kR1, KR2, kR3, KR4, KR5, KR6, KR7, kR8, KR9, kG1, kG2, kG3, kG4, kG5, kG6, kG7, kG8, kG9, kB1, kB2, kB3, kB4, kB5, kB6, kB7, kB8, kB9 of the mapping equations in the first equation set, the second equation set and the third equation set are solved out, and the image filter parameters are substituted into the mapping equations in the first equation set, the second equation set, and the third equation set, the mapping relationship of transforming the de-filter template image to the filter template image may be obtained.

According to an embodiment of the present disclosure, the image filter acquiring device 1503 may use numerical optimization algorithm (such as L-BFGS algorithm) to solve the first equation set, the second equation set, and the third equation set.

According to an embodiment of the present disclosure, the image filter acquiring device 1503 may use least square method to solve the first equation set, the second equation set, and the third equation set.

Compared with generating an image filter using global statistical information, the image filter proposed by the present disclosure contains rich and diverse color information, the filter effect is softer, more natural, contains more color features, and the effect is more beautiful.

After the image filter is obtained, the image rendering device 1504 may render an image to be processed (e.g., a third image) using the obtained image filter to output the fourth image.

According to an embodiment of the present disclosure, the image rendering device 1504 may use a direct calculation method to obtain pixel values of the image to be processed directly rendered by the image filter.

Specifically, when the above equation sets (i.e., the first equation set, the second equation set, and the third equation set) are solved out, for example, 27 image filter parameters may be obtained, that is, kR1, KR2, KR3, kR4, kR5, KR6, kR7, kR8, kR9, kG1, kG2, kG3, kG4, kG5, kG6, kG7, kG8, kG9, kB1, kB2, kB3, kB4, kB5, kB6, kB7, kB8, kB9. These 27 image filter parameters may be stored in a memory or a server and the like. When it needs to use an image filter function, the image rendering device 1504 reads these 27 image filter parameters, and use the pixel value of red channel, the pixel value of green channel, and the pixel value of blue channel of each pixel point of the image to be processed as the pixel value of red channel, the pixel value of green channel, and the pixel value of blue channel of each sampling point of the de-filter template image, and substitute them into the mapping equations in the above equation sets (i.e., the first equation set, the second equation set, and the third equation set), to calculate the pixel value of each pixel point of the image to be processed directly rendered by the image filter.

According to an embodiment of the present disclosure, the image rendering device 1504 may use a color lookup table method (LUT) to obtain the pixel value of the image to be processed directly rendered by the image filter.

Specifically, a 3D LUT (that is, a color look-up table method of three color channels (red channel, green channel, and blue channel)) may be used to obtain pixel values of the image to be processed after the image filter processing. The 3D LUT may first use the direct calculation method, calculate corresponding output red channel pixel value, green channel pixel value and blue channel pixel value for each input red channel pixel value, green channel pixel value and blue channel pixel value, using the mapping equations in the above equation sets (i.e., the first equation set, the second equation set, and the third equation set), and generate and store the color lookup table including the corresponding input and output red channel pixel values, green channel pixel values and blue channel pixel values. When it needs to use the image filter function, the image rendering device 1504 may call the color lookup table, and use the red channel pixel value, green channel pixel value and blue channel pixel value of each pixel point of the image to be processed as the input red channel pixel value and green channel pixel value and blue channel pixel value respectively, to obtain output red channel pixel value, green channel pixel value, and blue channel pixel value, as pixel value of each pixel point of the image to be processed directly rendered by the image filter.

According to an embodiment of the present disclosure, in the case that the image filter acquisition device 1503 divides the filter template into a plurality of different parts, and generate a mapping relationship for each part and/or generate an entire mapping relationship for all parts, thereby generating multiple image filters, the image rendering device 1504 may perform the following processes: segmenting the third image to obtain respective second segmented areas. For any second segmented area, obtaining an image filter corresponding to the second segmented area. Rendering the second segmented area using the image filter corresponding to the second segmented area, if there is no image filter corresponding to the second segmented area, rendering the second segmented area using the image filter corresponding to the first image, wherein, for the any second segmented area, an image filter corresponding to the first segmented area having a same segmentation category as the second segmented area in the first image may be determined as the image filter corresponding to the second segmented area.

For example, if the filter template image is segmented to generate 3 categories of segmented parts (category A/category B/category C), these 3 segmented parts may generate 3 different image filters, all the sampling points of the 3 segmented parts may generate an entire image filter. If the image to be processed is segmented to generate 4 types of segmented parts (category A/category B/category C/category D), the category A segmented part may be directly rendered using the image filter generated for the category A segmented part of the filter template image, and the category B segmented part of the image to be processed may be directly rendered using the image filter generated for the category B segmented part of the filter template image, the category C segmented part of the image to be processed may be directly rendered using the image filter generated for the category C segmented part of the filter template image, and the category D segmented part of the image to be processed may be directly rendered using the entire image filter generated for all segmented parts of the filter template image.

According to an embodiment of the present disclosure, in order to improve the effect of the image filter, the image rendering device 1504 may introduce a rendering degree when rendering the image to be processed. That is, the image rendering device 1504 may render the image to be processed using the image filter according to the rendering degree of the image to be processed. For example, the image rendering device 1504 may use the Alpha blending algorithm to control the rendering effect. According to an embodiment of the present disclosure, the image rendering device 1504 may directly render the image to be processed (third image), using the image filter, to obtain the fourth image, then fuse the third image and the fourth image based on the rendering degree to obtain the a fifth image. For example, the fifth image (that is, the final rendered result)=the third image×(1−the rendering degree)+the fourth image×the rendering degree. The rendering degree used in the method for performing rendering according to the rendering degree of the image to be processed according to the embodiment of the present disclosure may include, but is not limited to, the rendering degree determined based on human face areas in the image to be processed and the rendering degree determined according to the scene similarity between the filter template image and the image to be processed, which is introduced below. According to an embodiment of the present disclosure, when the image rendering device 1504 renders the image to be processed (e.g., the third image), the image rendering device 1504 may perform rendering further in consideration of the scene similarity of the filter template image (e.g., first image) and the image to be processed and/or whether there is human face areas in the image to be processed, so as to improve the rendering fidelity and avoid unnatural human face skin color. Specifically, the image rendering device 1504 may determine the rendering degree of the image to be processed according to the scene similarity between the filter template image and the image to be processed and/or the human face areas in the image to be processed, and render the image to be processed using the calculated image filter, according to the determined rendering degree.

Each pixel in the image to be processed has its own rendering degree. When there is no human face in the image to be processed, the rendering degree of each pixel is equal, which is determined by scene similarity. When there are human face areas in the image to be processed, the rendering degree of each pixel in the human face areas are calculated, and the rendering degree of other areas are determined by the scene similarity.

For example, the image rendering device 1504 may detect the human face areas of the third image, and determine the rendering degree of the human face areas based on the detected human face areas. Detect the scene similarity between the first image and the third image, and determine the rendering degree of other areas except for the human face areas in the third image according to the detected scene similarity. In other words, for the human face areas in the image to be processed, the image rendering device 1504 may separately calculate the rendering degree of the human face areas in the image to be processed, and for the area outside the human face areas in the image to be processed, the image rendering device 1504 may determine the rendering degree of the area outside the human face areas in the image to be processed using the scene similarity between filter template image and the image to be processed.

In the following, a method of determining the rendering degree of the human face areas according to the detected human face areas, by the image rendering device 1504 according to an embodiment of the present disclosure is specifically introduced.

According to an embodiment of the present disclosure, first, the image rendering device 1504 may divide every detected human face area into several blocks. Here, the detected human face areas may be a detected actual human face areas, or may be a human face areas after the detected actual human face areas are extended. For example, the human face areas may be extended by 20% in the image (extending the human face areas may effectively prevent the detected human face areas from being too small, and may protect the color rendering of the human face areas better). Subsequently, the image rendering device 1504 may calculate a human face color protection level of each block according to Gaussian distribution. For example, 2D Gaussian function may be used to build a human face color protection level table for each block. Subsequently, the image rendering device 1504 may obtain a rendering degree of each block according to the human face color protection level of each block. For example, the rendering degree of each block may be calculated as (1 minus human face color protection level). Calculating the human face color protection level through Gaussian distribution may make the filtering effect of the human face areas smoother and the color of the human face areas more natural.

Hereinafter, a method of detecting the scene similarity between the first image and the third image by the image rendering device 1504 according to an embodiment of the present disclosure is specifically introduced.

According to an embodiment of the present disclosure, the image rendering device 1504 may use a scene classification network to scene classify the first image (filter template image) and the third image (image to be processed). Determine the scene similarity of the first image and the third image based on scene classification result and features extracted by a set feature extraction layer in the scene classification network.

Specifically, if the two categories are consistent according to the scene classification result, the image rendering device 1504 may determine that the scene similarity of the first image and the third image is a maximum value (e.g., the similarity is 1), therefore, the rendering degree of the image to be processed may also be the maximum value (e.g., the rendering degree is 1). If the two categories are inconsistent according to the scene classification result, the image rendering device 1504 may calculate the scene similarity of the filter template image and the image to be processed using the features extracted by the set feature extraction layer in the scene classification network (which may be the middle output value of the scene classification network), and use the calculated scene similarity as the rendering degree of the image to be processed, wherein the scene similarity may also be referred to as scene consistency.

For example, the image rendering device 1504 may determine whether the two categories are consistent using the output of the scene classification network (i.e., the classification result). For example, if the classification result of the filter template image by the scene classification network is class c1, and the classification result of the image to be processed by the scene classification network is class c2, the image rendering device 1504 may determine that the scene categories of the filter template image and the image to be processed are inconsistent, and if the classification results of the filter template image and the image to be processed by the scene classification network are both class c3, the image rendering device 1504 may determine that the scene categories of the filter template image and the image to be processed are consistent.

Alternatively or additionally, the image rendering device 1504 may use the features extracted at the set feature extraction layer during the classification process of the scene classification network (e.g., the features extracted through the conv5 layer of the scene classification network) to calculate the scene similarity of the filter template image and the image to be processed. For example, the image rendering device 1504 may calculate the Markov distance dis of the normalized conv5 layer feature of the filter template image and the image to be processed, and calculate the scene similarity of the filter template image and the image to be processed as (1-dis), wherein values of the scene similarity may range from 0 to 1. The higher the value of the scene similarity is, the higher the degree of scene similarity is.

That is, when the scene categories of the filter template image and the image to be processed are consistent, the image rendering device 1504 may consider the scene similarity to be the maximum value (1), which is used as the rendering degree. When the scene categories of the filter template image and the image to be processed are inconsistent, the image rendering device 1504 may calculate the scene similarity using the features extracted in the set feature extraction layer during the classification process of the scene classification network, which is used as the rendering degree.

According to the method of image processing and electronic apparatus of the present disclosure, an image de-filter network is used to generate a template image in which the filter effect is removed, without pre-establishing an image library that stores a large number of sample images without the filter effect, which greatly reduces the required storage space and saves storage resources.

In addition, according to the method of image processing and electronic apparatus of the present disclosure, a network for implementing image de-filter is proposed, thereby improving the performance of the image filter.

In addition, according to the method of image processing and electronic apparatus of the present disclosure, based on an arbitrary image selected by the user as a filter template image, a template image in which the filter effect is removed with the same structure with thereof is generated, without finding an image with the similar structure without the filter effect, which improves the speed and efficiency of the image filter, and the filter method is more robust.

In addition, according to the method of image processing and electronic apparatus of the present disclosure, the image filter is generated by sampling the filter template image and the corresponding de-filter template image and using the color information mapping relationship of the sampling points. This method takes into account the global color information and partial color information of the image, and thus the effect of image filter is improved.

In addition, according to the method of image processing and electronic apparatus of the present disclosure, the scene similarity between the image to be processed (e.g., the camera preview image) and the filter template image is considered to generate the rendering degree for controlling the filter effect, thereby the filter effect that is not ideal, unreal, and not in line with the actual scene may be avoided.

In addition, according to the method of image processing and electronic apparatus of the present disclosure, the human face skin color protection in the image to be processed (e.g., the camera preview image) is considered to generate the rendering degree for the human face areas, so that unnatural skin color effect may be avoided.

In addition, according to the method of image processing and electronic apparatus of the present disclosure, in consideration of the image segmentation category (e.g., semantic segmentation category), different image filters are generated using different categories of areas of the filter template image, and the different image filters are applied to different categories of areas in the image to be processed, thereby improving the fidelity of the image to enhance the effect of the image filter.

The method of image processing and electronic apparatus according to embodiments of the present disclosure have been described above with reference to FIGS. 1 to 15.

The systems, devices, and units shown in FIG. 15 may be respectively configured as software, hardware, firmware, or any combination thereof to perform specific functions. For example, these systems, devices, or units may correspond to dedicated integrated circuits, may also correspond to pure software codes, or may further correspond to a combined module of software and hardware. In addition, one or more functions implemented by these systems, devices, or units may also be uniformly executed by components in physical entity devices (e.g., processors, clients, or servers, etc.).

In addition, the method described with reference to FIG. 1 may be implemented by programs (or instructions) recorded on a computer-readable storage medium. For example, according to an embodiment of the present disclosure, a computer-readable storage medium may be provided, on which computer programs (or instructions) for executing the steps of the method of image processing described with reference to FIG. 1 is recorded. For example, the computer programs (or instructions) may be used to perform the following steps: selecting a first image by a user. Obtaining a second image in which a filter effect applied to the first image is removed, using an image de-filter network. Obtaining an image filter corresponding to the filter effect based on the first image and the second image. Rendering a third image based on the obtained image filter to output a fourth image.

The computer program in the above-mentioned computer-readable storage medium may run in an environment deployed in computer equipment such as a client, a host, an agent device, a server, etc. It should be noted that the computer program may also be used to perform additional steps in addition to the above-mentioned steps or perform more specific process when performing the above steps. These additional steps and further processed content have been mentioned in the description of the related art method with reference to FIG. 1, so in order to avoid repetition, the description will not be repeated here.

It should be noted that the electronic apparatus of image processing according to the embodiment of the present disclosure may completely rely on the operation of the computer program to realize the corresponding function, that is, respective units correspond to respective steps in the functional structure of the computer program, so that the entire electronic apparatus is called by special software packages (e.g., lib library) to achieve the corresponding functions.

On the other hand, each device shown in FIG. 15 may also be implemented by hardware, software, firmware, middleware, microcode, or any combination thereof. When implemented in software, firmware, middleware or microcode, the program code or code segment used to perform the corresponding operation may be stored in a computer-readable medium such as a storage medium, so that the processor may perform the corresponding operation by reading and running the corresponding program code or code segment.

For example, an embodiment of the present disclosure may also be implemented as a computing device including a storage component and a processor. The storage component stores a set of computer executable instructions. When the set of computer executable instructions is executed by the processor, the method of image processing according to an embodiment of the present disclosure is performed.

Specifically, the computing device may be deployed in a server or a client, and may also be deployed on a node device in a distributed network environment. In addition, the computing device may be a PC computer, a tablet device, a personal digital assistant, a smart phone, a web application, or other devices capable of executing the above set of instructions.

Here, the computing device does not have to be a single computing device, and may also be any device or collection of circuits that may execute the above-mentioned instructions (or instruction set) individually or jointly. The computing device may also be a part of an integrated control system or a system manager, or may be configured as a portable electronic device interconnected with a local or remote (e.g., via wireless transmission) in interface.

In a computing device, the processor may include a central processing unit (CPU), a graphics processing unit (GPU), a programmable logic device, a dedicated processor system, a microcontroller, or a microprocessor. By way of example and not limitation, the processor may further include analog processors, digital processors, microprocessors, multi-core processors, processor, arrays, network processors, and the like.

Some operations described in the method of image processing according to the embodiment of the present disclosure may be implemented by software, and some operations may be implemented by hardware. In addition, these operations may also be implemented by a combination of software and hardware.

The processor may run instructions or codes stored in one of the storage components, wherein the storage component may also store data. Instructions and data may also be transmitted and received through a network via a network interface device, wherein the network interface device may use any known transmission protocol.

The storage component may be integrated with the processor, for example, RAM or flash memory is arranged in an integrated circuit microprocessor or the like. In addition, the storage component may include an independent device, such as an external disk drive, a storage array, or other storage device that can be used by any database system. The storage component and the processor may be operatively coupled, or may communicate with each other, for example, through an I/O port, a network connection, or the like, so that the processor can read files stored in the storage component.

In addition, the computing device may also include a video display (such as a liquid crystal display) and a user interaction interface (such as a keyboard, mouse, touch input device, etc.). All components of the computing device may be connected to each other via a bus and/or network.

The operations involved in the method of image processing according to the embodiment of the present disclosure may be described as various interconnected or coupled functional blocks or functional diagrams. However, these functional blocks or functional diagrams may be equally integrated into a single logic device or operated according to imprecise boundaries.

Therefore, the method described with reference to FIG. 1 may be implemented by a system including at least one computing device and at least one storage device storing instructions.

According to an embodiment of the present disclosure, the at least one computing device is a computing device of image processing according to an embodiment of the present disclosure, and a computer-executable instruction set is stored in the storage device. When the computer-executable instruction set is executed by at least one computing device, the steps of the method of image processing described with reference to FIG. 1 are executed. For example, when the computer-executable instruction set is executed by the at least one computing device, the following steps may be executed: selecting the first image by a user. Obtaining a second image in which a filter effect applied to the first image is removed, using an image de-filter network. Obtaining an image filter corresponding to the filter effect based on the first image and the second image. Rendering a third image using the obtained image filter to output a fourth image.

The various embodiments of the present disclosure have been described above. It should be understood that the above description is only exemplary but not exhaustive, and the present disclosure is not limited to the disclosed various embodiments. Without departing from the scope and spirit of the present disclosure, many modifications and alterations are obvious to those skilled in the art. Therefore, the protection scope of the present disclosure should be subject to the scope of the claims.

What is claimed is:

1. A method of image processing, the method comprising:
obtaining a first image;
removing, using an image de-filter network, a filter effect applied to the first image to obtain a second image;
obtaining, based on the first image and the second image, an image filter corresponding to the filter effect; and
rendering a third image using the obtained image filter to output a fourth image.

2. The method of claim 1, wherein the removing the filter effect comprises:
performing feature extraction on the first image, via cascaded feature extraction units of an encoder network of the image de-filter network, to generate an extracted feature map; and
decoding the extracted feature map, via cascaded decoding units of a decoder network of the image de-filter network, to output the second image.

3. The method of claim 2, wherein the performing the feature extraction on the first image comprises:
performing, using a portion of the cascaded feature extraction units other than a last feature extraction unit, at least one convolution process and at least one down-sampling process on an input feature map; and
performing, using the last feature extraction unit, at least two convolution processes on the processed input feature map, residual-connecting of the input feature map and the convolution-processed input feature map, and outputting the extracted feature map to the decoder network, and
the decoding the extracted feature map comprises:
performing at least one up-sampling process and at least one convolution process on the extracted feature map.

4. The method of claim 2, wherein the removing the filter effect further comprises:
down-scaling, using a pre-processing layer, the first image according to a preset size; and
outputting, to the encoder network, the down-scaled first image.

5. The method of claim 3, wherein the removing the filter effect further comprises:
obtaining, from an image segmentation network, at least one type of segmentation information from among segmentation information for the first image;
concatenating the first image with the at least one type of segmentation information to obtain at least one type of merged first image; and
inputting, to the encoder network, the at least one type of merged first image.

6. The method of claim 5, wherein the removing the filter effect further comprises:
    concatenating, using at least one decoding unit of the decoder network, an up-sampled feature map with the convolution-processed input feature map corresponding to a same scale feature map; and
    performing at least one convolution process on the concatenated feature map.

7. The method of claim 1, wherein the obtaining the image filter comprises:
    obtaining a mapping relationship of transforming the second image to the first image; and
    obtaining the image filter according to the mapping relationship.

8. The method of claim 7, wherein the obtaining the mapping relationship comprises:
    acquiring a plurality of first sampling points in the first image and a plurality of second sampling points corresponding to respective first sampling points in the second image; and
    obtaining the mapping relationship of transforming the second image to the first image by determining mapping relationships between the respective first sampling points in the first image and the corresponding second sampling points in the second image.

9. The method of claim 8, wherein the acquiring the plurality of first sampling points in the first image comprises:
    detecting a salient target in the first image;
    acquiring a first portion of the plurality of first sampling points in a first area where the salient target is located in the first image; and
    acquiring a second portion of the plurality of first sampling points in a second area outside the salient target in the first image, and
    wherein a first density of the first portion of the plurality of first sampling points is greater than a second density of the second portion of the plurality of first sampling points.

10. The method of claim 1, wherein the rendering the third image comprises:
    determining a rendering degree of the third image, according to at least one of a scene similarity between the first image and the third image, and one or more human face areas in the third image; and
    rendering the third image using the image filter, according to the rendering degree of the third image.

11. The method of claim 10, wherein the determining the rendering degree of the third image comprises:
    determining rendering degrees of the one or more human face areas according to the one or more detected human face areas;
    detecting the scene similarity between the first image and the third image; and
    determining a rendering degree of another area, other than the one or more human face areas in the third image, according to the detected scene similarity.

12. The method of claim 11, wherein the detecting the scene similarity between the first image and the third image comprises:
    performing, using a scene classification network, scene classification on the first image and the third image; and
    determining the scene similarity of the first image and the third image, based on a scene classification result and features extracted by a set feature extraction layer in the scene classification network.

13. The method of claim 11, wherein the determining the rendering degrees of the one or more human face areas comprises:
    dividing each detected human face area of the one or more human face areas into a corresponding set of blocks;
    obtaining a human face color protection level of each block in the corresponding sets of blocks, according to a Gaussian distribution; and
    obtaining a rendering degree of each block in the corresponding sets of blocks, according to the human face color protection level of that block.

14. The method of claim 11, wherein the rendering of the third image comprises:
    fusing the third image and the fourth image based on the rendering degree of the third image to obtain a fifth image.

15. The method of claim 1, wherein the obtaining of the image filter comprises:
    segmenting the first image to obtain corresponding first segmented areas;
    acquiring an image filter corresponding to at least one first segmented area of the corresponding first segmented areas; and
    acquiring an image filter corresponding to the first image based on the image filter corresponding to the at least one first segmented area and the second image.

16. An apparatus for image processing, comprising:
    an image de-filter network;
    a memory storing instructions; and
    at least one processor in communication with the image de-filter network and the memory, wherein the at least one processor is configured to execute the instructions stored in the memory that, when executed by the at least one processor, cause the apparatus to:
    obtain a first image;
    remove, using the image de-filter network, a filter effect applied to the first image to generate a second image;
    obtain, based on the first image and the second image, an image filter corresponding to the filter effect; and
    render a third image using the obtained image filter to output a fourth image.

17. The apparatus of claim 16, wherein the image de-filter network comprises:
    an encoder network configured to perform feature extraction on the first image, via cascaded feature extraction units, to generate an extracted feature map; and
    a decoder network configured to decode the extracted feature map, via cascaded decoding units, to output the second image.

18. The apparatus of claim 16, wherein instructions to obtain the image filter further cause the apparatus to:
    obtain a mapping relationship of transforming the second image to the first image; and
    obtain the image filter according to the mapping relationship.

19. The apparatus of claim 16, wherein instructions to render the third image further cause the apparatus to:
    determine a rendering degree of the third image, according to at least one of a scene similarity between the first image and the third image, and one or more human face areas in the third image; and
    render the third image using the image filter, according to the rendering degree of the third image.

20. The apparatus of claim 16, wherein instructions to obtain the image filter further cause the apparatus to:
    segment the first image to obtain corresponding first segmented areas;

acquire an image filter corresponding to at least one first segmented area of the corresponding first segmented areas; and acquire an image filter corresponding to the first image based on the image filter corresponding to the at least one first segmented area and the second image.

* * * * *